United States Patent
Jordahl

(10) Patent No.: US 7,246,128 B2
(45) Date of Patent: Jul. 17, 2007

(54) DATA STORAGE, RETRIEVAL, MANIPULATION AND DISPLAY TOOLS ENABLING MULTIPLE HIERARCHICAL POINTS OF VIEW

(76) Inventor: Jena J. Jordahl, 26 Willow St., Wellesley, MA (US) 02481

( * ) Notice: Subject to any disclaimer, the term of this patent is extended or adjusted under 35 U.S.C. 154(b) by 366 days.

(21) Appl. No.: 10/461,182

(22) Filed: Jun. 12, 2003

(65) Prior Publication Data
US 2004/0036716 A1 Feb. 26, 2004

Related U.S. Application Data

(60) Provisional application No. 60/388,095, filed on Jun. 12, 2002.

(51) Int. Cl.
*G06F 17/30* (2006.01)
(52) U.S. Cl. .................. 707/100; 707/101; 707/102
(58) Field of Classification Search ......... 707/100–102
See application file for complete search history.

(56) References Cited

U.S. PATENT DOCUMENTS

| | | | |
|---|---|---|---|
| 5,940,822 A | * | 8/1999 | Haderle et al. ............... 707/3 |
| 6,003,027 A | * | 12/1999 | Prager ........................... 707/5 |
| 6,085,226 A | | 7/2000 | Horvitz ........................ 709/203 |
| 6,334,131 B2 | * | 12/2001 | Chakrabarti et al. .......... 707/10 |
| 2003/0208399 A1 | * | 11/2003 | Basak et al. .................. 705/14 |

OTHER PUBLICATIONS

Beerud Sheth et al. "Evolving Agents for Personalized Information Filtering", IEEE: 1993.*

* cited by examiner

*Primary Examiner*—Charles Rones
*Assistant Examiner*—Phuong-Thao Cao
(74) *Attorney, Agent, or Firm*—Foley Hoag LLP

(57) ABSTRACT

Systems and methods for data storage, retrieval, manipulation and display provide search engines and computer-based research tools for enabling multiple hierarchical points of view. Category definitions in the hierarchical data structures can include lists of set members, like word arrays of set members, generative descriptions for determining set members, and fitness functions for determining fitness of a presented item for being a member of a set. Significance and interest values can be assigned to search categories to set threshold confidence levels for returning search results and for weighting the results, respectively. A user interface can present results in the form of browsing multiple hierarchical representations, wherein matching categories are differentiated from non-matching categories. Peer ratings can represent the ranking of search term results with relation to results using other search terms, providing an indication of the fitness of the search terms for returning satisfactory results.

31 Claims, 12 Drawing Sheets

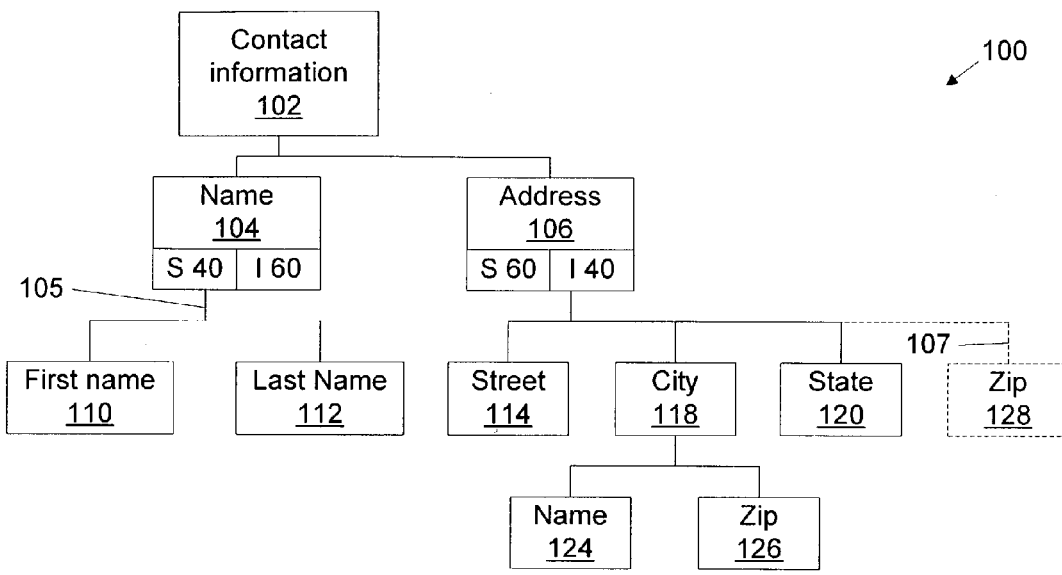
FIG. 2A
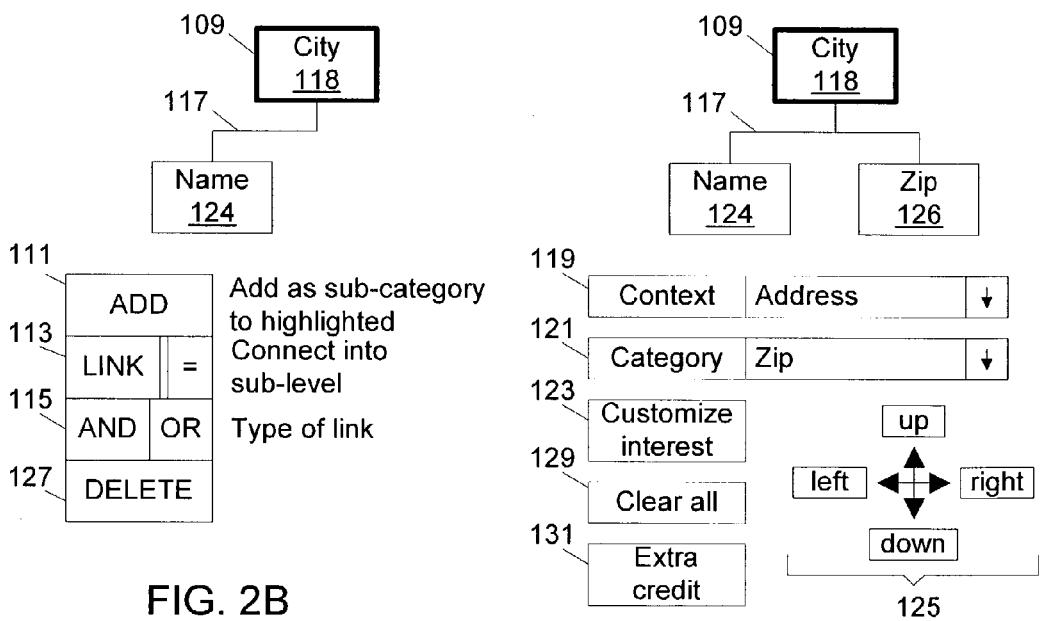
FIG. 2B
FIG. 2C

DATA STORAGE, RETRIEVAL, MANIPULATION AND DISPLAY TOOLS ENABLING MULTIPLE HIERARCHICAL POINTS OF VIEW

RELATED APPLICATIONS

This application claims priority to, and incorporates by reference, the entire disclosure of U.S. Provisional Patent Application No. 60/388,095, filed on Jun. 12, 2002.

FIELD

This systems and methods relate to the field of computers, and more particularly to the field of computer database systems and methods.

BACKGROUND

The advent of the computer has permitted dramatic increases in the capability to store and manipulate data. The development of computer networks, such as the Internet, has provided unprecedented access to data. However, the proliferation of data does not necessarily maximize the usefulness of that data. In fact, proliferation of data can, in some circumstances, even serve as an obstacle to clear understanding, such as by obscuring connections between data or burying the most relevant data among a large amount of irrelevant data.

Methods and systems are needed to assist users in making more effective use of data. One general way to make more effective use of data is to provide an organizational structure for the data. That is, data may be more easily understood if it is stored and presented according to a particular point of view. One way of representing an organizational structure or a point of view is a hierarchy. One example of such a hierarchy is a "drill down" hierarchy in which each level of a hierarchy represents related subcomponents of the next higher level of the hierarchy, with related elements of the various levels of the hierarchy being connected by lines or arrows. Representing data elements via a hierarchy can improve utilization of the data, because the data can be found, examined and manipulated based on its location in the hierarchy. For example, a simple hierarchy for personal information might include high level fields of "name" and "address," with second level fields of "first, last and middle" for "name" and "street number, street name, city, state and zip code" for "address." Systems and methods exist for storing data related to such a hierarchy. Creating connections between available data and the hierarchy categories while using the hierarchy to focus attention on the distinguishing features thus allows the user to impose some meaning on the data relative to other data related to the same hierarchy.

Conventional database systems and methods can be subject to a number of problems. Primarily, people change the data structures very slowly, many times as a means of implementing change controls. If the structures underlying the data can be built in such a way that based on one's focus area the data relationships show up differently, then the system can exhibit rigor in validating the storage of information while providing exceptional manipulation and analysis capabilities. Though current database technology supports different views of the same data, this is not the same as providing different contexts for acting on the data. Current technology provides views that act as censors, blotting out information considered irrelevant to the defined view.

It can be suggested that the same data may have dramatically different meaning and significance depending on the point of view of the person, group, or agent who is using the data. For example, a zip code might be highly relevant to a party wishing to send a letter but irrelevant to a party seeking driving directions to a particular location. Such a simple example may not present a major problem because the user can simply ignore the zip code, but when uses of the same data are in increasingly different contexts, conventional database methods and systems are increasingly ineffective at providing useful database functions for the different contexts. As a result, users typically build distinct databases for different uses of the data, even though the data content may overlap substantially.

What is needed is a system that permits the storage, retrieval and manipulation of a given set of data in different contexts. In particular, a system is needed that permits a user to establish a point of view, such as via a hierarchy, and that allows the user to retrieve, manipulate, and display data according to that point of view. Moreover, since a user's own point of view may change, the system should allow the user or users to establish multiple hierarchies or points of view and to use the hierarchies interchangeably regardless of the structure of the data in connection with the hierarchies. The system should also permit users to conveniently construct and modify hierarchies that can be of a wide variety of types and should not be limited to a single hierarchy or type of hierarchy.

Conventional search tools typically allow text- or string-based searching in which the user inputs a word or phrase, either in Boolean form or as an unstructured string, and in which the system outputs a document or a list of documents that are ranked according to conventional algorithms, such as weighting according to term frequency and inverse word frequency within a document. In such conventional systems, the input does not reflect any logical structure, particularly any hierarchical structure. In other search tools, the search must conform to the structure of the data that is being searched. The search may indirectly reflect the underlying structure of the data, but the search does not reflect the user's point of view to the same degree as would a hierarchy that establishes the user's point of view. Accordingly, a need exists for a system that permits the user to conduct a search and view results that reflect the unique requirements defined by the user's point of view.

In addition, a system that permits users to search other users' points of view and to integrate those points of view with those of the user can be beneficial. Users may also wish to have the system suggest other points of view as more profitable informational Points of View (iPOV's) than their own. The system should therefore be able to generate new iPOV's by permutating the existing and relevant iPOV's and electronic Bodies Of Knowledge (eBOK's).

Further, the system should permit use of hierarchies in different stages of data processing. A user should be able to create a representation of a point of view, to manage the point of view, to use the point of view to assist in clustering related information, and to use the point of view as a visualization tool with respect to data. Thus, hierarchical displays should be supported, as well as storage of hierarchical information and iPOV searches. Optimized searches require projects of hierarchical data into specialized forms allowing easy access to the data by multi-path search algorithms. Each of these features might be provided as a component linked to a conventional database system, or the components could be provided together as an integrated system.

SUMMARY

The systems and methods create an environment where the analysis of similarities and differences between pieces of information can be customized and displayed in a manner that is easily understood. Unique points of view can be employed in decomposing complex information into manageable chunks while at the same time providing a container for the more amorphous concepts of context and relatedness. Maps, specifically hierarchical maps, can be the metaphor of choice for codifying and displaying the relationships between pieces of information and the importance of a piece to the point of view. Because the systems and methods can be easily customizable and configured to run on various computer hardware for numerous purposes, the core aspect of the systems and methods need not be limited to the visualization used to present the point of view or to the particular search technique employed. While these components can be important for the functioning of the system, it can be understood that future implementations can include other UI metaphors and alternate search routines. Mapping can include representations that express a point of view and the search routines can express the similarities and differences between how information shows up relative to that point of view.

When all aspects of the system are employed together, the systems and methods can include a system architecture that allows for both pattern recognition routines and logic rules to ascertain the relevance of a piece of information to a point of view, relationships between the point of view, and the frame of reference that provide a broader context within which the point of view can be understood, and methods of relating information to either the point of view or the frame of reference. A set of transformational and statistical language data can provide the backdrop for similarity functions to assess relatedness when the data presented does not identically match. Language can be interpreted broadly to include systematic methods of communication or sensation through a device. e.g., English, Latin, Cobol, image, sound, ultra-sonic, or encrypted language.

Similarity functions can determine exactly how similar something must be to be considered related, and difference functions can determine exactly how different something can be before being considered unrelated. As an example for the string of letters "Ave", abbreviation similarity functions can acknowledge that "Ave" can be an abbreviation for the word "Avenue". Difference functions can indicate that two strings of letters, one being half as long as the other and not being an abbreviation or alternate name for the other, are not related.

Since information in a computer system is stored in memory or on storage media such as hard drives, CD roms, DVD's, etc., the systems and methods can consist of information on how to access and manipulate information in various kinds of formats. In a preferred embodiment, the systems and methods can use the distinctions in points of views, frames of reference, similarity and difference functions, and relatedness maps such as hierarchies when storing and manipulating data access information. Additionally, the systems and methods can store information used to manage its own control and customization in the same format and using the same methods as that used to store application information.

BRIEF DESCRIPTION OF THE DRAWINGS

The following figures depict certain illustrative embodiments in which like reference numerals refer to like elements. These depicted embodiments are to be understood as illustrative and not as limiting in any way.

FIG. 2A illustrates a hierarchical representation of contact data;

FIG. 2B illustrates a user interface for adding an element to the hierarchy representation of FIG. 2A;

FIG. 2C illustrates a user interface for describing the added element of FIG. 2C;

DETAILED DESCRIPTION

Figure 1A:
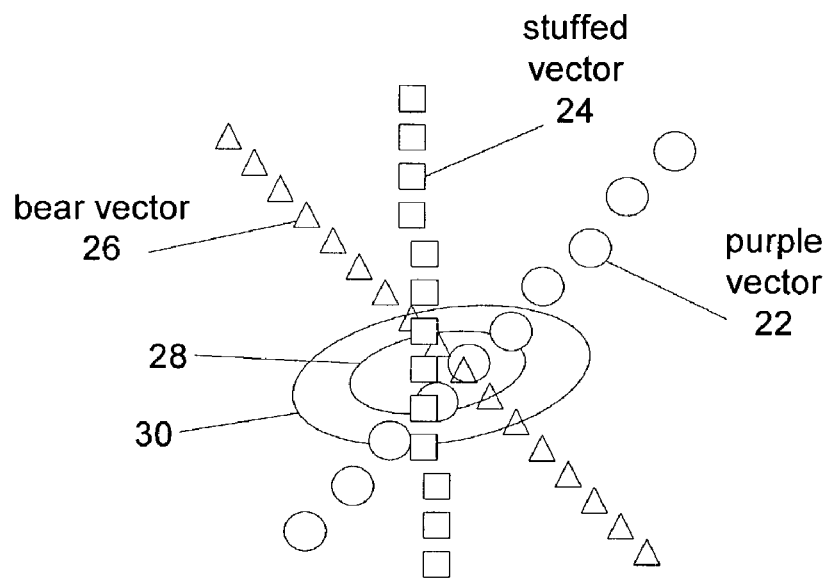
FIG. 1A illustrates a vectored data arrangement and related rings of data.

Certain terms used herein can include the following definitions.

As used herein, a "research item" can include any computer readable symbol used to represent information of any type. The symbols could reference or represent picturesque landscapes, sounds, concepts, or words from any language.

As used herein, a "search universe" can include any number of research items accessible to a particular computer system at the time the system attempts to look for research items matching an iPOV distinction.

As used herein, a "procedure" can include any process able to be reduced to a program running on a computer system. The procedure may constitute a stand-alone program or a routine within another larger program such as an SQL statement that runs within a database management system.

As used herein, a "fitness function" can include any process where the result of executing the process returns a measure of how well a research item fits within prescribed boundaries. An example would be a function that could determine whether any given number is a prime number, returning a Boolean measure, yes or no. Fitness functions can accept parameters as input values. Many fitness functions can be specified for a category, and the functions themselves can be characterized and categorized by the system to facilitate performance goals.

As used herein, a "category" can include a name for a distinction such that a set where all members express the distinction can be identified or indirect methods for identifying set members can be specified. The term category is thus defined to unify the commonplace computer science distinctions of data and processes. A category always possesses a unit of measurement to define the basic shape of its membership. For instance a "good customer's" category could possess the unit of measure "household", letting the system know the type of members. The category "bird" can be defined by exhaustively listing all known names of birds including both extinct and living species. It could also be defined by a list of words related to birds but not names of birds, i.e. "crop, wings, feathers, gizzard and bidr" The first four words relate to bird parts. The last text string expresses the common typographical error for the word "bird". Although the words or text string themselves do not distinguish the category bird as it has been defined above, they incline a person to believe that the category "bird" is being referred to indirectly, especially if many different indirect references appear together. Similar words can thus be used to distinguish indirect references to a category. Methods for generating set members can define procedural definitions of a category. If all the names for birds were stored in a relational database table named "Bird" under the column heading "BirdName", then a database query procedure could be specified to select the category membership from the table. The procedure would be defined simply as "Select BirdName from Bird".

Fitness functions can determine whether a research item expresses the distinction called for by a particular category. Assuming the same "Bird" database table exists, a fitness function to determine if the research item "Robin" fits within the category bird would be "Select "yes" from Bird where BirdName="Robin". To generalize the fitness function for use with other research items, assume the variable "ResearchItem" equates to the symbolic value of the research item, i.e. "Robin". The fitness function could be stated as "Select "yes" from BirdName=ResearchItem." Category distinctions can be defined by a discrete set of members, a set of similar members, a procedure to generate a discrete set of members, a fitness function to test for adherence to category membership guidelines. A category represents both discrete set members, i.e. data, and the processes that can be defined to identify members of a set.

As used herein, a "near list" can include a list of words or simbols close in association to members of a category. A similarity score can be connected with a symbol in the near list. The similarity score can reflect the degree of connection between the symbol in the near list and the category distinction. Near lists can be used to define a category by providing a set of similar symbols.

As used herein, "similarity procedures" can include category fitness functions that focus on the similarities between category members. Typically, similarity procedures can specify characteristics or patterns that when present qualify a research item for inclusion in a category. For example, an inclusive similarity procedure for the category "fun" could define all the typographical errors related to the word "fun" via a procedure that factors in the closeness of various letters on a computer keyboard. The result of the procedure could be the creation of a near list or pattern. An excerpt of such a near list could include: "ufn, .96; fnu, .98; fyn, .98; etc." Category definition functions that focus on similarities can be marked as such.

As used herein, "difference procedures" can include category fitness functions that focus on the differences between category members and nonmembers. Difference functions frequently can be defined by rules that state assertions such as "research items that contain two more letters than the category name string can never be given a similarity score higher than 70%". The above assertion excludes certain research items from ever being considered a very close match. Typically difference functions can draw exclusionary category boundaries. Category definition functions that define differences can be marked as such.

As used herein, a "category database" can include mechanisms to store category definitions and hierarchical structures to store relationships between categories. The systems and methods herein can be understood to be internally structured as a set of interrelating category hierarchies and able to represent the external world as a set of interrelating category hierarchies.

As used herein, within the category database "hierarchical relationships" between categories can include weighted set operators like union or intersection. For people more comfortable with logical operators, "or" mimics the union set operator, and "and", the intersection set operator. A primary qualitative link between parent and child categories in the hierarchical systems proposed herein can include the relationship "is composed of". In which case, logical "or" and the union set operator relationships can correlate to the qualitative link "component part". Since alternate hierchical subsystems could define the same information (i.e. zip code and city state information both define similar geographic regions of a postal address), it is possible through category weighting to express an inclusive subtype relationship where the parent is understood to be composed of either or both types of components. Along the same lines, exclusive subtype relationships can specify that a parent can be composed of one of the various related children. The category database can store relationships between categories such that the strongest connections between elements occur within a subsystem and the weakest connection, across hierarchies.

As used herein, "hierarchical database structures" can include database design techniques typical for storing "bill of material" information and projecting the information out into denormalized tables for faster processing. Such data design methods are known to anyone with competent skill in the discipline. Actual category definitions can be stored in one location within the database while the hierarchical relationships between categories can be stored in another. In this way definitions need not be repeated every time the same category relates to another category. In this way, the redundancy inherent in complex systems can simplify the structure of the information systems and representations of the environment.

As used herein, a "HI diagram" can include a diagram composed of different types of lines representing different types of hierarchical relationships between categories. The boxes in the diagram can contain category names/identifiers and can show associated interest weights and significance thresholds. The HI diagram can describes a distinction via combining categories into near decomposable hierarchical units. In other words, the diagram can display several hierarchical category groupings for which categories in different groupings may be related, but the weak connections across hierarchies are not shown as lines. Instead, weak connections can become evident after research items are evaluated. When many research items consistently fulfill the criteria of both categories then some dependency or weak connection can likely exist between them. The HI diagram notation including interest weights and significance thresholds can be translated by the systems and methods herein into computer executable functions that return a relevance score assessing how closely a research item fits with the distinction/category defined by the diagram as a whole.

The systems and methods herein can make the equation easily modifiable via manipulation of a diagram and adjustments of weights and thresholds, and can apply it to category membership evaluation or automatic classification. For each diagram category, the system can determine its level of confidence that a research item is a member of the category. The evaluation process can be performed by the Relativity DBMS.

As used herein, a category's "interest weight" can include values defined by the diagram creator or automatically generated based on the physical location of a category within the diagram. As an example, categories to the left and above items can receive higher interest values where items lower and to the right can receive higher significance values. It can be understood that schemes for assigning relative interest and significance values based on the location of an item on the UI can be customized for the user's preference.

As used herein, a category's "significance threshold" can act to contain the activities of the similarity search engine at the time an application seeks to evaluate whether a research item is a member of a category. Significance thresholds can draw cut off lines where membership confidence values below the specified threshold are returned as zero. Since the Relativity DBMS has the significance threshold at the beginning of the membership evaluation process the threshold, in addition to acting to return zero values to the weighted equation, can act to abandon fitness evaluations that will likely return membership confidence scores below the threshold. Therefore, the threshold can contain the exhaustiveness of the membership evaluation employed and the values returned. The significance threshold can include values defined by the diagram creator or automatically generated. In one embodiment, the automatically generated threshold can be based on subtracting the category's interest weight from 100 and multiplying by 0.01. It can be understood that the significance threshold can be independent of the interest. However, the relationship described above derives from a realization that someone having an a high interest in an item can have the evaluation process allow for wider variation in set membership scores.

As used herein, "point of view" or "individual point of view (iPOV)" can include a HI diagram which expresses itself via groups of hierarchically linked categories. Category definitions can be considered a first level of elementary subsystems employed by the systems and methods described herein, with iPOVs being the next level subsystem composed of category definitions, weights, and thresholds. This subsystem can be used as a search mechanism and shared amongst many users. The system architecture allows for storage, retrieval, manipulation, display, combination and contribution of iPOVs.

As used herein, "KnowBOK" can include knowledge agents that interrogate the search universe and can store, retrieve, manipulate, and suggest changes to category definitions, iPOVs, eBOKs, or language databases. KnowBOKs can function to automate the creation of category definitions from available data sources such that connections can be made from search iPOVs out to external sources without user intervention. To do this, KnowBOKs can associate categories with textual documents in various natural languages via analyzing the words in the document. They also can transform information in system tables of current database systems such that category definitions can be defined for all tables and columns, codes and their various values can be translated into category definitions, and the database design can be translated either into one DB specific eBOK, several subject area eBOKs or both. As the database structures are transformed into category definitions, KnowBOKs can enhance the category definitions to reflect additional classification of data elements along well understood dimensions for a data architect with competent skill in the art.

As used herein an "eBOK" can include linked categories similar to an iPOV but with additional information so as to encode an electronic Body Of Knowledge. An eBOK can provide a frame of reference within which iPOVs function. An eBOK can be composed of various iPOV's with additional information related to external sources, security and means of educating oneself about a category. As an example, a rudimentary eBOK can contain information on data types and methods for distinguishing various elements within the data types, thus encoding the computer science body of knowledge associated with information management. An eBOK can be built by integrating various iPOVs, specified directly by a user, or can be generated as a combined effort between a user and the system itself. The eBOKs tend to be larger than iPOVs as they can include comprehensive coverage of a subject area. Due to their size, suitability of an eBOK for use as a visualization mechanism can be limited to use by data architects.

An eBOK can reference category definitions internal to the system, link category definitions via hierarchies as well as encode connections to external data sources via additional category attributes. The additional category attributes can be specialized links between two category definitions. Hence, it can be seen that the format for the attribute information can include the previously described category definitions. Example attributes of an eBOK can include "visual" and "authority". The visual attribute can provide an entry or a list of key value pairs that can define the system providing a visualization method for the specified data and the format of the data that the visualization system requires. The authority attribute can provide an entry or list of key value pairs that can define the authority in the world responsible for defining set membership and security and/or request transit mechanisms for gaining access to up-to-date set definitions.

For example, the US Postal Service can be considered the authority for US zip codes and can be accessed via their website or other zip code validation tools using no particular security information but providing US addresses with between 5 to 9 digit zip codes. An example of a related visual attribute for US zip codes can include "tool: MyMAP; format: lat & long polygons", referring to utilizing a mapping tool, MyMAP, which can request data in the format of latitude and longitude coordinate polygons to visualize the zip code. In this way, eBOKs can serve to coalesce frequently used category definitions, relationships between category definitions, and links to external information sources for things like educational material to further understand the category distinction, visualization tools, security requirements and data access formatters.

As used herein, a "Language Database" can include databases where the information contained is a further linguistic backdrop or frame of reference for use when executing iPOV searches. Language databases can be thought of as being composed of eBOK's which are composed of iPOVs which are composed of category definitions. Category definitions defined in the structures just mentioned need not be repeatedly stored. Various information can be visible when looking at it from an eBOK perspective versus an iPOV or language database perspective. It can be understood that language can be interpreted broadly as mentioned above. Linguistic units, or words, can be stored in the same type of category definition structures, and similar to the eBOK the category definitions can be augmented by specialized attribute category relationships. For a Language Database the attributes can reflect linguistic connections like parts of speech, phonetic description, and source language and/or word etymology. Via near list definitions the closeness in meaning between two words can be captured through relatedness statistics.

High percentage relatedness scores can demarcate synonyms while very low relatedness scores can connote antonyms. In this way, a continuum of relatedness can be expressed. In the statistical language database multiple near lists can be associated with one category or linguistic unit to represent the multiple meanings of a linguistic unit within various contexts. The units within the lists can provide sufficient information to tie the near list to related contexts. The Language Database provides a mesh of connections between linguistic units via relatedness statistics.

A Language Database can be rich or sparse. Automated processes can generate language databases via utilizing iPOVs to search for similarities or differences amongst a universe of language definitions, etiology research, synonym lists and/or antonym lists. In other words, the automated functions can process dictionary and thesaurus type information for a particular language and can build category definitions for the various language components. The similarities between related parts can be are captured via creating near lists. The intersections of near lists create a mesh of connections between language units. Therefore, the Language Database can follow the same pattern for storing information as those discussed for storing information about iPOV or eBOK categories. The user can think about an iPOV as capturing personal language definitions, an eBOK as capturing a domain specific use of language, and a language database as encoding general use of language.

As used herein, a "Relativity Database Management System" (Relativity DBMS) can include databases where the internal functions manipulate the category definitions described above and spawn threads connecting members of a category on demand. These spawned threads become the flexible structures giving form to the search space defined by an iPOV search process. An analogy with gravitational forces can serve to provide an understanding of the operation of a Relativity DBMS. A category's interest weights can act like gravitational forces pulling in system resources to create new threads or extend existing threads to new members. In the way that gravitational forces can bend the fabric of space/time, a Relativity DBMS can bend the computational fabric of data and processes surrounding a category definition. High category significance values in an iPOV can act to focus and limit the research items that will experience the gravitational forces of the categories. In this way, categories with high interest weights can act like planets with large mass by creating gravity wells to draw in research items. The significance thresholds can specify a category's desired gravitational reach or the distance a research item can be found from the center of the category's gravity well. A Relativity DBMS can generate threads to connect related items creating pseudo gravity wells of meaning that physically change the substratum of the database.

A Relativity DBMS can also define a multidimensional search space shaped by the interaction of various gravity wells. Isolating just a few gravity wells, the shape of the search space is akin to a 2D plane convoluted by mountains and valleys. However, since the full search space can encompass innumerable dimensions, a spherical volume can metaphorically represent the full search space. Initially iPOV categories can be thought of as being spread out uniformly within a spherical volume. The more heavily weighted categories can be placed towards the origin of the sphere and the lighter weight categories can be placed towards the outer shell. As research items are uncovered they can be placed within the search space in such a way that their position reflects the "gravitational" pull of the various categories of which the item is a member.

The overlap of gravitational pulls can fix a research item in a position within the search space. An item being pulled on from heavily weighted categories towards the origin can be fixed in the center of the spherical volume. The system can set a match threshold or defined distance from the center of the overall search space for which items falling within that space can be returned as the results of a search. A Relativity DBMS therefore includes the capability of grasping the number of categories in which a research item participates and mapping a search space accordingly.

Finally, a Relativity DBMS can link categories in iPOVs with those in eBOKs and Language Databases. The links can assist in further developing the interest gravity well created for an iPOV category. The eBOK and Language Database can serve as the mechanism to expand similarity searches to allow the system to find items that match category requirements closely but not identically. The links can be made via matching overlap in category definitions or membership lists. Hence, the system can create new category definitions by combining existing ones from iPOVs, eBOKs or Language DBs. The system can express creativity via defining a new category or search dimension that relates research items through bringing together new combinations of categories, or new perspectives on relating information. By analyzing the various overlapping items within various threads in the multidimensional search space as specified, a list of closely related items possessing the required category distinctions can be obtained, allowing the computation of a relevance score for a research item that retains partial relevance scores associated with the categories in the iPOV.

As a Relativity DBMS can create new category definitions, the distinction between definitions defined by the user and those created by the system while exploring a search space can be made. A Relativity DBMS can qualify category definitions as either user confirmed or system generated. System generated category definitions can be referred to as assertive descriptions while those provided by users can be referred to as proposed descriptions. In defining the search space, the Relativity DBMS can discover iPOV category descriptions that poorly segment a search space or eBOK definitions that poorly identify members of a category and the system definitions can easily be skewed by coincidental similarities present in the research items. The system can highlight such issues, indicating whether the definitions in question are assertive descriptions or proposed descriptions, allowing the user responsible for the respective eBOKs or iPOVs to resolve the issues.

As used herein "Related Communication Protocols" (RCP's) can be understood to include methods for communicating or referencing published iPOVs, eBOKs, Language Databases, or their subsidiary category definitions, so as to share complex distinctions amongst users or computer system agents. Data integration systems can exchange iPOVs prior to data transfers such that the context related to the data can be exchanged in addition to exchanging an array of data element names. It is expected that various multipurpose iPOVs, eBOKs and Language Databases can be published and generally available. Within such an environment, the communication of category definitions of the above items can include a reference to the desired structure.

The reference can be encrypted in various ways to ensure security and privacy for the communication of the published item. The underlying Connections Database of the Relativity DBMS can store unique identifiers for the stored iPOV, eBOK, Language Database, or subsidiary component (a hierarchy or category). An example of a unique key that can reference the "jeans" category within a woman's clothing iPOV can include the iPOV identifier (such as 342), hierarchy identifier (such as 782), parent node identifiers (such as 234,56,4,234), and finally the category identifier (such as 12342), resulting in a series of numbers (such as 342,782; 234,56,4,234;12342). By virtue of a Relativity Database's capacity to transform language categories into encrypted RCP protocols, the Relativity Database can be used to create encoded messages. By exchanging either the published identifier, the unique database identifier, or some other unique key computer systems can share complex distinctions stored within a Relativity DBMS.

As used herein, "Relativity Authentication" can include multidimensional references made to information within the Connections Database. A user with an appropriate key, which can include a date sensitive key, can decipher the meaning of an encrypted RCP, such as the integer list given above so as to point to a specific category in an iPOV or eBOK. By having a shorthand, encrypted notation for passing information, the systems and methods described herein can include an embedded form of encryption used to transmit information from one system to another over insecure transit routes. Thus, the relativity databases and/or users can connect to other relativity systems and can point to a single item in a potentially complex system.

The encryption scheme described above can be used to authenticate users and/or can allow anonymous connection to a relativity-based server. As an example, an anonymous user transmitting the appropriate key using the encrypted RCP protocol need not be individually verified or authenticated for the system to be sure the request comes from a trusted source. Thus, a Relativity DBMS can alleviate the bottleneck associated with current DBMS's channeling requests through one set of user authentication structures. As an example of Relativity Authentication used in conjunction with a retrieval request, the user can send the encrypted identifier described previously (342,782;234,56,4,234;12342) and the name of the category to be found at that location in the Connections Database, in this case the category name "Jeans". Different users or user roles can be given different encrypted RCP protocols for entry into the system such that individual user activity can be tracked.

As used herein, a "Posted Points of View" (PPV) can include an iPOV or partial iPOV available to the public via standard publishing means and/or via electronic form, e.g., via the Internet.

As used herein, a "Data Interchange PPV" can include a set of multiple hierarchies which group together information and define the format of the information, including the punctuation expected between data items, so as to be transferable in a language using the world-wide standard of two word byte codes for individual letters or kanji characters.

As used herein, a "PPV process" can include a process that can state the various forms of data it can accept and the various forms of data it can produce.

As used herein, "PPV servers" can include systems capable of understanding the forms of data needed for a process, the current format of the data and the form of output a process will produce with respect to the current data, and mechanisms to translate a given output format to a desired output format, with the formats and conditions being described by eBOK descriptions. In other words, a PPV server can operate as an automated data management and administration engine that can manage relativity data in memory, disk, and/or other storage media and can communicate with processes to ensure that correctly formatted data can be sent to a process despite recent changes that may have taken place to the data or the process.

As used herein, a "frame of reference" can include a particular body of knowledge in which an item of data can appear, such as "human knowledge," "physics," "medicine," "finances" or the like. It can be understood that a particular word or item of data can have very different meaning in different frames of reference.

As used herein, "point of view" or "individual point of view" can reflect a particular individual's or entity's way of looking at data within a frame of reference. The point of view can be thought of as a filter for data within the frame of reference. Points of view can embody an individual's view of the significance and interest of particular data. Set theory can be used to build a point of view, asking with respect to a data element, for example, whether it is a member of a particular set or whether it is an exact match, or partial match, to another element or item.

The process of identifying items of interest to a system can hinge on basic functions, including pattern matching to identify items and activation of a frame of reference based on the items identified. These functions can be closely tied to information about items and work primarily based on attention to detail, operators of comparison and noticing the similarities between items.

Pattern matching can be interpreted as one way an information system can perceive its world. Pattern matching can be used to identify words in a language, objects in a picture, categories in a classification system, or regularities in empirical data. A pattern can represent something the system recognizes and has an interest in remembering. Pattern recognition programs can look for specific known patterns and/or can adjust behavior to "learn" new patterns. Known methods for finding patterns can include: Boyer-Moore string matching, tree pattern matching, deterministic finite automaton methods used in lexical analyzers of compilers and Bayes' Theorem applied to computing pattern probabilities.

A frame of reference can be activated based on a combination of the cognitive theory of spreading activation, hierarchic structuring of complex systems and the concept of viewpoint relativity. The cognitive theory of spreading activation can act on a data structure called a semantic network. A semantic network can join together concepts through links that show relationship, and the length of each link can be based on the degree of association the concepts enjoy, e.g., the shorter the links the closer the relationship. Activating a frame of reference can include retaining the essential mechanism of spreading activation while acting within hierarchical contexts. The strongest relationships can exist within a subsystem at the lowest level of the hierarchy. Subsystems comprising other subsystems can enjoy a strong connection. The weakest connections can exist across hierarchies.

Viewpoint relativity can provide the ability to account for complex relationships between the world and an observer and the ability to allow one to choose the frame of reference for analysis entirely as a matter of convenience. A frame of reference can reflect the user's interests in two ways. First, if a frame of reference has not yet been chosen, then the spreading activation throughout the myriad of hierarchies can serve as the mechanism for selecting a frame. Spreading activation within hierarchic structures can moderate the spread of energy based on the distance between components and the type of relationship which connects them. The stronger the hierarchical connection the more energy the related node receives. Thus, activating the frame of reference can include selecting the frame of interest with the highest concentration of energy. Second, an activated frame of reference can serve as a focus to present the observer with items of interest only within the frame of reference.

Thus, the interest component of an information system can utilize pattern matching to identify items of interest and initiate the spreading activation process for the frame of reference activation. The frame of reference activation can relate the elements which make up the system to the user's point of view. The choice of the frame of reference can reflect the user's interest and can act as a focus for different aspects at different times. Viewing information in a hierarchical manner can allow one to flexibly model the interactions of a number of complex systems. The hierarchic structures selected within a frame of reference can provide a basis for determining similarities between elements of the system.

The determination of the significance of various inputs, states, objects, and events can focus on the differences between those items. The differences can equate to assigning differing priorities to the items or to sequencing the items within the system. Prioritization can compare elements and can process them consistent with known priorities of the system. For example, parsing of input can be thought of as prioritization. Prioritization can spread the activation of an item within the system appropriate to the kind of hierarchical relationships that the item enjoys and can determine the weight to give various relationships. Further examples of prioritization processes can include scoring functions and sorting algorithms.

Sequencing can determine the respective ordering of items and can provide a sense for the time it will take to go through a sequence of elements. Sequencing can ground the system in physical realities and provide the possibility for the system to realize when a task cannot be accomplished. Thus, the system can self-correct and can look for other alternatives. Sequencing can be based on the data structures of the system, including arrays, linked lists and binary trees, and the associated search algorithms, including indexing, random accessing, functional accessing and other search algorithms.

The interest and significance components of the system can communicate via various means including manipulating shared data structures, using "call" operators, and/or real-time message passing. Call operators can include control commands to allow one process to call another so as to provide for data to be sent from one process to the other. Message passing can include agreed upon methods by which one process can interrupt another and send it information. Message passing, when implemented so as to minimize interruptions, can effectively communicate that one component has found information which might be of use to the other.

As used herein, "database" can include a variety of computer software, computer hardware, firmware and other entities capable of storing, manipulating and retrieving records, data and other information, including relational, object-oriented, in memory, file system, html, image, audio and other databases.

As used herein, "server" can include a device and/or method capable of interacting with a client or plurality of clients or similar devices in the client-server model of computer technology, as well as a device and/or method supporting a network computing environment and/or providing access to computing services, including hardware servers, software servers, web servers, HTTP servers, and other available types of computer devices and/or methods capable of providing server functions.

As used herein "network" can include a computer network, including the Internet, as well as an intranet, extranet, Worldwide Web, local area network, wide area network, telephony network, power line network and/or other network, capable of providing data communications functions.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

The drawings and descriptions herein can include several examples of hierarchy user interfaces and the related concepts employing their use, as well as several different types of hierarchies including matching hierarchies, research hierarchies, search hierarchies, node definition hierarchies, computation hierarchies, category selection hierarchies, and orders-of-magnitude hierarchies. The types of hierarchies can be UI views of the various hierarchy information. The database technology for supporting the multiple hierarchy UI can include a relativity database, which can store information about the relative connection between one piece of information and another.

Figure 12:
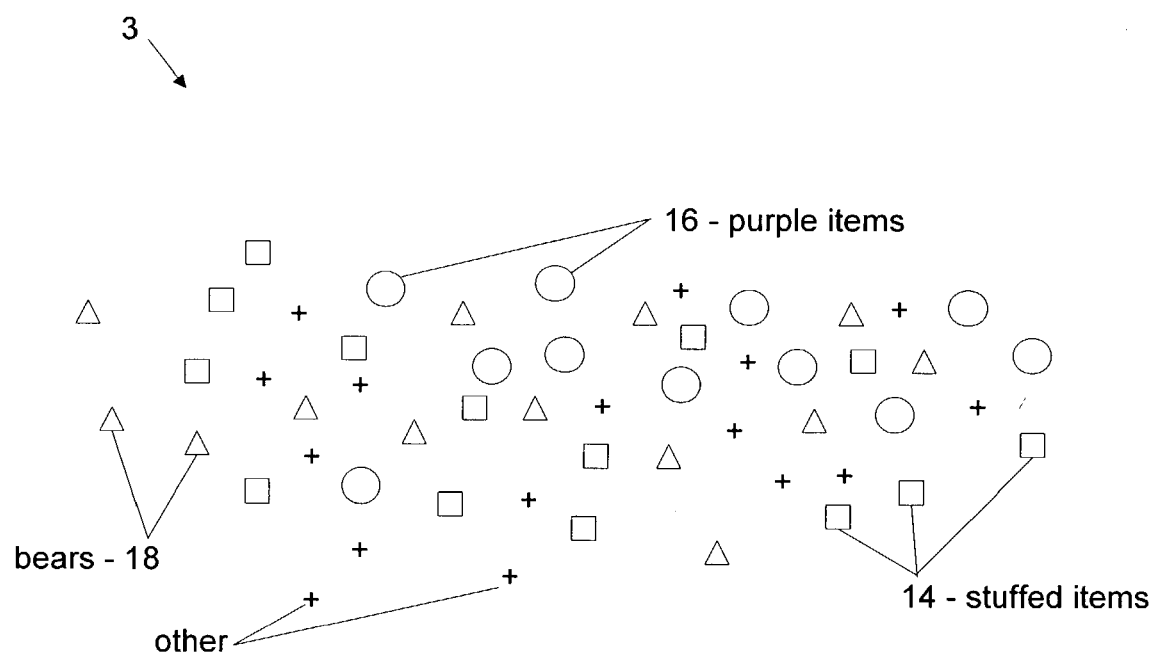
FIG. 12 illustrates data stored in a database.

Referring to FIG. 1A, a simplified model of the spherical search space described previously can be presented to assist in understanding the systems and methods described in more detail with relation to the other figures herein. The model of FIG. 1A can manipulate and categorize items from a universe of data, as illustrated in FIG. 12. FIG. 1A represents the state of one possible application of the system being used as a search tool. In this example, the system can re-organize the data such that items relevant to an iPOV defined by the user can be organized into an ordered list, e.g., the image of the data vectors in FIG. 1A. Data unrelated to the iPOV can be ignored. Based on significance and interest values assigned to the various iPOV categories, a non-identical search process begins building the related rings of data. These rings can contain the match items falling within various match thresholds. As an example, the inner ring can represent items which match to within a certain level of confidence and the outer ring can represent items matching to within a lesser level of confidence. A match threshold can be set by the user to determine which result shells or rings can be displayed.

The systems and methods disclosed herein can include a UI and a back-end. The UI can permit interaction of a user or users with the system, including by a graphical display. The back-end can allow the user to store and manipulate data and to perform searches. The systems and methods can find use in data storage, manipulation, retrieval and display tools, including Catalog search tools, Auction search tools, Internet search tools and research tools for study of databases of information.

FIG. 12 can illustrate data stored in a database, including data related to interests expressed by the user. The exemplary hierarchy 10 of FIG. 1B can illustrate a user's interest in auction items 12, specifically stuffed items 14, purple items 16, and bears 18. In terms of stuffed items 14, the user can be particularly interested in collectibles 20. In FIGS. 1A and 12, data related to stuffed items 14, purple items 16 and bears 18 can be identified with square, circle and triangular symbols respectively. Other data in database 3 can be shown by the + symbol.

FIG. 1A can provide a visualization of the reorganization of data that the systems and methods can perform when requesting a search according to hierarchy 10. In FIG. 1A data related to being purple, data related to being stuffed and data related to being a bear can be organized into data vectors 22, 24 and 26, respectively, with the information in each vector ranked based on a computation of nearness to the other vectors. In FIG. 1A "nearness" can be expressed as rings 28, 30 that can demarcate thresholds of relatedness. As an example, the inner ring 28 can reflect 80–90% nearness or relatedness, and outer ring 30 can reflect relatedness to within 10%. It can be understood that the database 3 of FIG. 12 and the data structures of FIG. 1A are not limited to the two dimensional representations in the figures, but can include multidimensional data structures.

By restructuring database 3 to provide the structure illustrated in FIG. 1A the created space, e.g., rings 28 and 30, can put items of greatest relatedness nearer to one another making more likely that a finite length search of a very large space can retrieve well-qualified or significant occurrences related to the hierarchy 10 by the "interest" vectors. As used herein, interest can reflect similarities between items and significance can reflect differences. Thus, significance can act as the mechanism, e.g., logic rules, for drawing boundaries, such as rings 28 and 30. Whereas, interest can, through pattern recognition algorithms, create hierarchies that form the various vectors. For example, the stuffed vector 24 can include items such as a stuffed chair, but only stuffed items of significance to the search for purple, stuffed bears can fall within the rings 28 and 30.

Figure 1B:
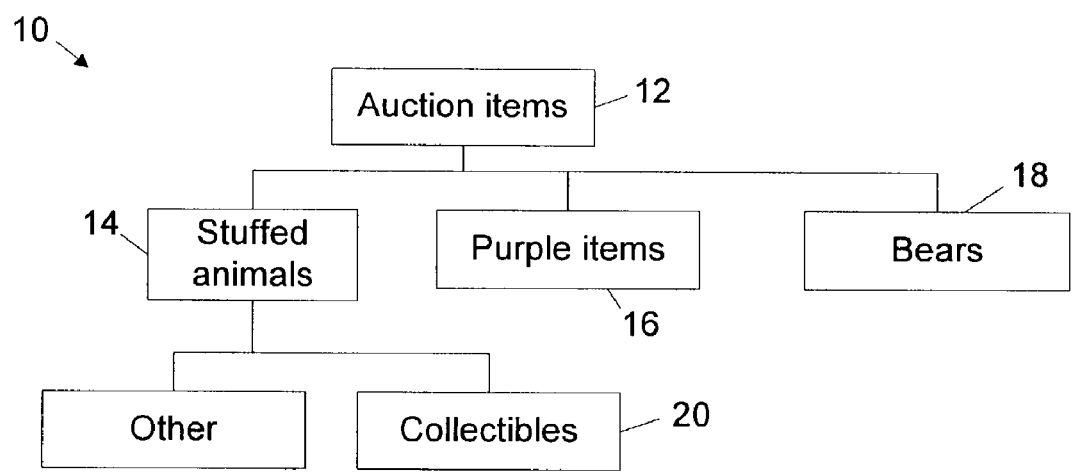
FIG. 1B illustrates a more detailed view of the data arrangement of FIG. 1A.

As illustrated by the hierarchy 10 of FIG. 1B resulting in the database structure of FIG. 1A, the systems and methods herein can include a user interface (UI) through which a user can specify an iPOV or hierarchy that can result in structuring a database in the form of a relativity database, or connections database. Relativity databases can provide for two functional definitions of sets (as defined by set theory), assertive definitions of sets, fitness function definitions of sets, in addition to the common list of constituents as found in current databases.

User Interface

The UI can provide a number of functions, including: Creation of Points of View, Modification of Points of View, Three Dimensional Visualization, Searching by Point of View, Heat Map Display Based on Matching, Filtering by User Interface, Searching with Filters, and Integration of Multiple Points of View, described in more detail below.

Using the UI, the user can establish a point of view, or iPOV, in the form of a hierarchy, which can be presented graphically to the user. The UI can function as a visual tool for creation of graphical displays of hierarchies. The graphical displays can be manipulated, such as using conventional "drag and drop" tools in a graphical UI environment, such as a Windows® environment. A wide variety of hierarchy types, or points of view, can be established, displayed, and manipulated in the UI. Examples include drill down hierarchies and physical coordinate systems. In another example, a degree of relationship between two elements can be presented visually through a vector, the length and direction of which can represent the type and/or degree of relationship between the elements at the end of the vector. Thus, users can establish hierarchies that can be used, as described below, to view and manipulate data in a way that reflects a context, point of view or frame of reference.

The creation of an iPOV can entail, in addition to the establishment of a graphical display of the iPOV, the creation of underlying logic modules based on the structure of the data in the hierarchy. For example, the inherent logic of a particular type of hierarchy display can be coded into executable logic modules that can be parsed by the systems and methods herein to permit manipulation of the hierarchy for the execution of rules of set theory, mathematical matching, and other purposes as disclosed herein. As an example, a drill-down hierarchy can be logically represented by simple set theory by code that identifies each element of each level of the hierarchy as a sub-set of the particular element of the next highest level of the hierarchy to which the element is connected. Thus, dragging and dropping a new element below a particular element in the hierarchy and connecting the new element to the particular element with a line can, in the executable code for the hierarchy, identify the new element as a subset of the particular element. Other hierarchical structures (such as membership of elements in common sets) can be represented by code that embodies set theory and related simple mathematical logic constructs. The logic modules can unpack data structures in the connections database or other databases to generate hierarchies that can be displayed to the user.

A variety of logic modules can be established, depending on hierarchy types needed to represent a particular point of view. For example, a logic module can be established to represent parentage, wherein a link between two entries in adjacent rows of a hierarchy display can imply that the entry in the higher row is a "parent" of a "child" entry in the lower row. Parentage can describe human ancestry, genetic inheritance of humans, plants, animals, cells and the like, as well as a variety of parent-child relationships in other systems. For example, the resulting compound in a chemical reaction can be viewed as a "child" of "parents" consisting of the reaction constituents. Similarly, a physical state can be viewed as a child of a previous physical state, such that different rows in the hierarchy can represent changes in time. Thus, a variety of different systems can be represented as parentage hierarchies, which can be established and manipulated using a generic parentage logic module.

Logic modules can consist of prepositional logic regarding sets of attributes. Thus, membership in a row of a hierarchy can be attributed to membership in a set, with logic modules applying set theory to determine set membership for a particular row in a hierarchy. By using an appropriate logic module, a recognizable pattern can be reduced to a hierarchy type. Examples include single hierarchies, multiple linked hierarchies, and hierarchies tied together by a bond, such as a common element or structure. Examples of bonded hierarchies can include a Lender: Student:Institution hierarchy bonded by a student loan, a Lender:Borrower:Payee hierarchy bonded by a loan, a Person:Disease:Medication hierarchy bonded by a prescription, a Product:Customer hierarchy bonded by a purchase, a Movie:Actor hierarchy bonded by a role, a Male:Female hierarchy bonded by an offspring, and many others. The iPOV of a particular hierarchy can be generated by applying the underlying logic module to a data structure. Sets can be established within and between the hierarchies to permit matching based on whether a data item is within or outside a given set. By establishing hierarchies of this type, key dimensions to a given data set can be identified. Once the key dimensions are identified, they can be placed in hierarchies as key fields for database records.

After an iPOV is established, such as provided by the UI in the form of a hierarchy of linked levels appearing on the user's screen, the iPOV can be modified, such as to reflect learning, or to reflect a different frame of reference for a particular use of data. In an embodiment, an iPOV, and the code that relates to particular elements of the hierarchy, can be modified by interacting with the graphical UI, such as by clicking, dragging and dropping elements of the hierarchy into other screen locations. For example, if a component is found to have greater importance than previously thought in an iPOV, then it can be dragged to a higher level in the representation of the iPOV appearing on the user's screen.

Referring to FIG. 2A, an exemplary UI can be illustrated that depicts a hierarchy 100 for data related to contact information for a user and tools used to manipulate the hierarchy. The elements of the hierarchy 100 can include an element identifying the contact 102, such as a unique code, personal information number, database record number, or the like. Other elements can include the name 104 of the contact, which can include the first name 110 and the last name 112. Further elements include the address 108, which can be broken down into street/number 114, city 118 and state 120. The city 118 can be broken down into the city name 124 and the zip code 126.

FIGS. 2B and 2C can illustrate the UI tools for adding and defining elements in a hierarchy, such as hierarchy 100 of FIG. 2A. FIG. 2B shows a partial view of hierarchy 100 prior to adding the zip code 126. To add zip code 126, the user can first highlight the category or element (city 118) to which the zip code element can be added. The highlighting can be illustrated in FIG. 2A by the darkened outline 109 of city element 118. By clicking on or otherwise choosing the action button 111, a new element or category can be added as a sub-category to city element 118. Clicking or otherwise choosing the "link=" action button 113 can connect the zip code 126 into the sub-level containing name 124. The action button 115 can designate the type of sub-level link 117 between name 124 and zip 126 as an "AND", or "OR" type link, with the different types of links being illustrated with varying line designations. The different types of links can relate to logical operators used in searches conducted with respect to the hierarchy, e.g., an "OR" link between name 124 and zip 126 can indicate that a city can be identified by either a name or zip code.

FIG. 2C can illustrate the UI tools for defining the added element 126, shown in a partial view of hierarchy 100. The user can choose the context for the zip code category from a drop down menu 119 of contexts related to the category city 118. Similarly, the category can be chosen from a drop down menu 121 of categories related to the chosen context. Additional action buttons can allow the user to customize interest 123 in the category and change the position of the category within its sub-level (positional button group 125), as described further below. It can be understood that the UI's of FIGS. 2B and 2C are intended as illustrative examples only and that the systems and methods herein can include UI's having additional action buttons. For example, the UI's of FIGS. 2B and 2C can include a "delete" action button 127, clear action button 129, extra credit action button 131, and other action buttons for manipulating the hierarchical representation and defining the categories therein.

Obviously, other means of arranging the information relating to a contact's name and address can be used. For example, middle names and titles can be added under the name field 104, or the street/number field 118 can be broken down into two separate fields. As an example of modifying a hierarchy, the user can decide that the zip code 126 is of greater significance than the city name 124 for the user's purposes. Thus, the user can move the zip code field 126 to a higher location in the hierarchy, such as to the location 128, shown in phantom in FIG. 2A, and make the connection 107 such that the zip code field 126 can have a significance on par with the street field 114, the city field 118 and the state field 120. This can be accomplished, for example, by dragging and dropping the box for the zip code field 126 to the new location 128.

The modification of hierarchies and the related code can be accomplished using known coding techniques, such as those used to develop computer-aided design and computer-aided software engineering tools. Visual elements can be linked to code objects, so that visual representations, when manipulated on the screen via the UI can result in changes to the code that represents the hierarchy. It can be understood that in certain embodiments of the systems and methods herein, hierarchies can be depicted so as to reflect multi-dimensional iPOV's.

The hierarchies can encode the degree of connection between components such that the relativity database can connect two pieces of information. For example, FIG. 2A illustrates significance (S=40) and interest (I=60) values for items 104 and 108. The significance value can relate to a threshold value for a confidence level of the search results to be returned. For example, S=40 can indicate that the minimum confidence level for a search result to be considered a match is 40%. The interest value can indicated the weight to be given an element. For example, I=60 can indicate that the name element 104 can have a weight of 0.60. Thus, in order for the name and address of a particular contact to be displayed, the name and address can match that in the iPOV at least to the confidence levels specified. The weights given to matches at one level can affect the overall confidence in the match at the next higher level of the hierarchy. For example, if a name is returned with a 90% confidence level and address is returned with a 60% confidence level, the contribution to the confidence of a match of the contact information can equal the confidence level times the weight for each category, or (0.9×0.6)+(0.6×0.4)=0.54+0.24=0.78. Whereas if name is returned with a 60% confidence level and address is returned with a 90% confidence level, the contribution to the confidence of a match of the contact information can equal (0.6×0.6)+(0.9×0.4)=0.36+0.36=0.72.

In the case where the user can input S and I values, the sequence of the items on a level of the iPOV need not affect the results returned. For example, since S and I values are provided for items 104 and 108 in FIG. 2A, moving address 108 to the left of name 104 will not affect the results returned. In one embodiment of the UI, the S and I values for an item can be defined by the position of the item on the screen. For example, the items at the far left can be of greatest interest and least significance, while items at the far right can be of greatest significance and least interest. The relevance of being at a given level can affect the spreading of the degree of connection up from the lowest level. As described below, the system can attempt to start looking for matches at an efficient starting point. It can then progress down the hierarchy and up the hierarchy based on the threshold matches found. A match hierarchy can be set to choose the number of matches to be presented, including setting the match hierarchy to choose the first match it gets, the first X matches, the best X number of matches above P probability, the set of matches above P probability, or other set of matches.

In one embodiment, the S and I values can be apportioned to items in levels below the parent, based on the position of the vertical connector from the parent category box down to the child level with respect to center point of the parent category box. When the system is on visual calculation mode, the calculated significance and interest values can be normalized to add to a total of 100, though it can be understood that other schemes for determining the relative S and I values for elements from their positions can be adopted. In the example of FIG. 2A, S and I values can be apportioned to items 110, First Name, and 112, Last Name, based on the position of connector 105, with respect to the center point of the parent category box for Name 104. As an example, a numeric progression of weights, or I values can be assigned to First Name 110 and Last Name 112, the child categories of Name 104. The position with respect to the center point can be expressed as a percentage P, equal to the number of pixels from the connector to the center point divided by the number of pixels from the center point to an end of the category box. The S values, or confidence threshold levels can be based on the calculated I values, e.g., by normalizing the sum of the S and I values to 100, as described above.

Exemplary apportionment, or numerical progression schemes can include one in which, starting from the left of the list of child items, a child item can be given P % more contribution to the match total than the item to its right. For example, if the connector 105 is two pixels from the center point of category box for Name 104 and the category box for Name 104 is twenty pixels in length, or ten pixels from the center point to an end, P=2/10=0.20=20%. Thus, First Name 110 can receive 20% more contribution than Last Name 112, or First Name 110 can be given 60% of the weight and Last Name 112 can receive 40% of the weight.

To continue with this example, if First Name 110 matched identically, its match confidence would be 1 but its contribution to the next level up matching can be equal to match confidence times weight (1*60%)=60%. If Last Name 112 matched with 0.5 confidence then it can contribute only (0.5*40%)=20% to the overall matching of the Name 104. Hence Name 104 would be considered to match to the sum of the weighted matches of its children, thus having an overall relatedness of 60%+20%)=80%. A generalized equation for the above scheme can be developed for the calculation of a weight W to be assigned to a child item as follows:

$$W = \frac{(100-P)}{n} + \left(1 + \left(\text{round}\left(\frac{n}{2}\right) - s\right) * \frac{P}{n}\right),$$

where n is the number of children items and s is the number in the sequence of children items for which the weight is being calculated, e.g., s=1 for the first child item, s=2 for the second child item, etc. Round( ) can denote rounding up n/2 when n is odd. As a further example, for P=30% and the number of children items, n=3, the weight for the second child in the sequence (s=2) can be calculated to be:

$$W = \frac{(100-30)}{3} + \left(1 + \left(\text{round}\left(\frac{3}{2}\right) - 2\right) * \frac{30}{3}\right) = 23 + (1+2-2)*10 = 33.$$

As noted previously, the corresponding threshold for the confidence level can be (100–33), or 67%.

Various methods for determining the proportion P and the weights W can be used, including those provided in the above examples. Such methods can generally determine the weights based on the placement of the categories and/or the connectors in the hierarchies, including relative sizes, lengths and other visual characteristics of the hierarchies. For example, P can indicate a ratio of weights, such that a weight of a child item divided by the weight of the next child item in the sequence of child items can indicate a P increase in weights:

$$\frac{W_1}{W_2} = (1+P),$$

e.g., if P=20%, then for two children in the sequence, $W_1$=54.5 and $W_2$=45.5. It can be understood that the UI can include systems and methods for relating visual displays and/or pixels to search match criteria in addition to those listed.

The confidence level assigned to a match can vary with the degree of matching. Identical matches can be assigned a confidence level of 1.0. Confidence levels for non-identical matches can be obtained from the connections database, as described in further detail below. Non-identical matching can be performed related to the lowest leaf nodes of a hierarchy, the leaf node for a branch of a hierarchy being the last level down in which data appears for that branch. When the hierarchy relationships no longer identify whether something matched based on lower level components than the break down of information uses the eBOK and non-identical matching functions to resolve if two items are related based on non-identical methods.

The systems and methods herein can perform searches using hierarchies as input. The data to be searched can be structured or unstructured, with the execution of the search being different depending on the nature of the search. A variety of search inputs can be used, a variety of data types can be searched, and a variety of output types can be obtained in conducting hierarchy-based searching. In embodiments, possible search inputs include a word or text string, an entire hierarchy, a set of sub-components of a hierarchy, and/or a data file. The data to searched can include a hierarchy, a subset of a hierarchy, a file, an unstructured database, or a structured database. Output types can include prioritized lists ranking data objects, such as files or documents, according to significance, hierarchies or sub-hierarchies that are highlighted to reflect the data results, and/or the data itself. The output types can include multi-dimensional visualization of the data searched, as previously described for creating or modifying an iPOV, and heat maps of the retrieved data, as described further below.

The systems and methods described herein can suggest a point of view to a user. In an embodiment, the user can input a line of text, reflecting a word, string, or category, such as stuffed bears. The system can then look for stored hierarchies that include the component stuffed and hierarchies that include the component "bears." The user can then peruse the available points of view to determine whether one or more of them may be useful.

The systems and methods disclosed herein can enable improved display of the significance of certain items of interest or significance within a data set or hierarchy. In particular, the UI disclosed herein can provide a user with a "heat map," in which particular data elements can be highlighted, depending on the nature of the search conducted. For example, referring to FIG. 3, an ancestral hierarchy 130 is illustrated. The ancestry of a person can be seen as a series of interconnected fields, including a person field 148 identifying the person, as well as fields representing various relatives, including a mother field 142, father field 144, maternal grandfather field 132, maternal grandmother field 134, paternal grandfather field 138, paternal grandmother field 140, siblings field 150, sons fields 152, daughters fields 154, nieces fields 158, nephews fields 160 and grandchildren fields 162.

As with the other types of hierarchies that can be supported by the present methods and systems, the ancestral hierarchy 130 can be one of many possible representations of data relating to ancestry. For example, an ancestral hierarchy can show only female ancestors, or male descendants, depending on the user's interests and desired point of view. The fields can be associated with a data record related to individuals who fit the field description. For example, the maternal grandfather field 132 can be associated with a data record in which biographical data related to the grandfather can be stored, such as employment history, eye color, hair color, date of birth, and the like.

Thus, a user can use the hierarchy to display certain types of search results. For example, a user can search the data records for individuals appearing in the hierarchy 130 who have blonde hair. The UI can alter the display of the hierarchy to reflect the results, e.g., the records relating to blonde-haired individuals can be highlighted in some way. Applying this example to FIG. 3, if the data indicates that the maternal grandfather, the person, the son and the grandchild have blond hair, the related fields 132, 148, 152 and 162, respectively in FIG. 3, can be highlighted as indicated by the bolded lines surrounding the fields. In this way, the user can obtain a convenient and powerful display of the lineage of particular traits within the person's ancestry.

A heat map can be particularly useful where data being examined can be non-exclusive and independent. The heat map can assist a user in determining what data participates in both a hierarchy and a data set. The user can thus use the UI as a filter to try to find relationships between items of data. For example, if the user conducted a search, placing a high significance (as described below) on "milkweed" and "butterflies," the search results can likely include data relating to monarch butterflies (which obtain food from milkweed), revealing a connection between the two query words.

By finding connections between different variables, the user can establish a multidimensional database representing a three-dimensional model of the world. For example, a point on the globe can then be associated with various characteristics, such as temperature, rainfall, elevation, habitat, and the like. Similarly, an ecosystem can be modeled by showing, with respect to a species, a time lapse for the species based on characteristics related to other data relevant to the species, such as what it eats, where it started, what its reproductive cycle is, and the like.

With a geographic overlay and these variables, a time lapse can be presented in a series of graphical views, showing the development of the range of the species. In other words, time can be one of the variables in a multidimensional hierarchy, with changes in time being represented by changes in the state of other variables. The filtering process described above, wherein a user scrolls through a database looking for interesting patterns in a "heat map" of a hierarchy, can assist the user in identifying dependencies or connections between a hierarchical view and a data set. Once a connection is established, the model for a particular system can be adjusted to include data relevant to the identified variable.

Areas of application can include systems for modeling global warming, reproduction based on food supply, biological systems, chemical contamination, water systems, linguistics (language changes over time) and many others. In the linguistic example, a word can be evaluated over time to determine migration from a particular string to a new string, within a whole language or within a subset.

Figure 3:
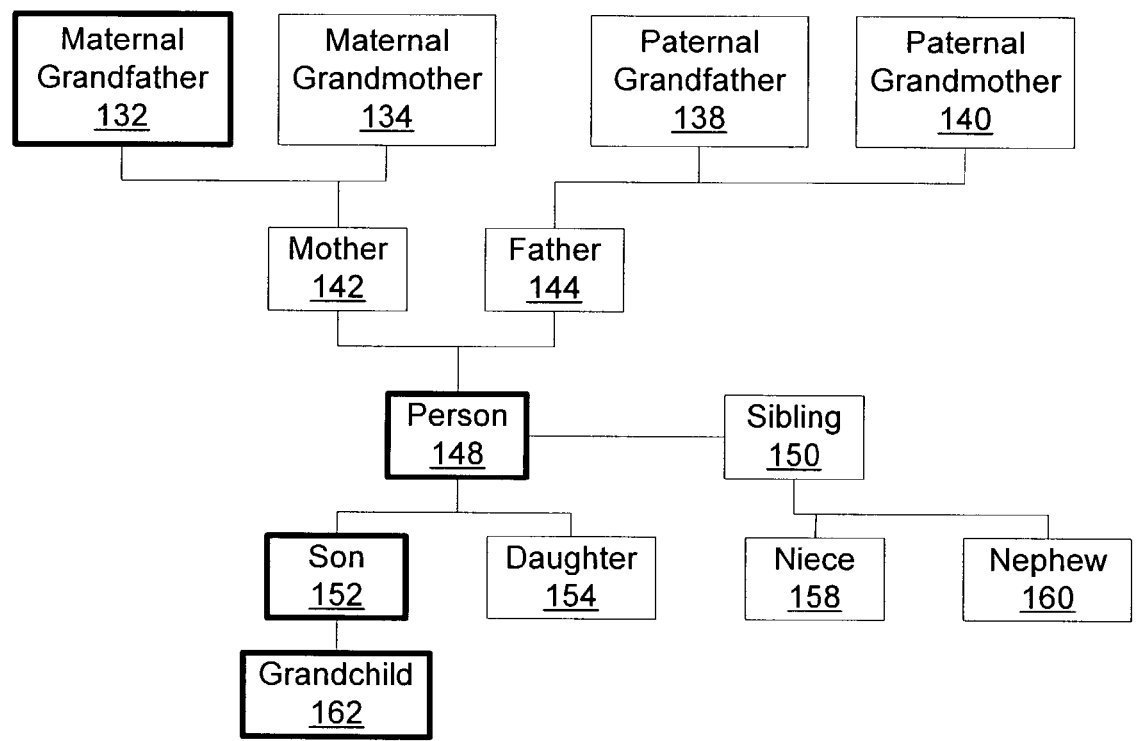
FIG. 3 illustrates a hierarchical representation of ancestral data.

Hierarchies, such as the ancestral hierarchy 130 of FIG. 3, can be used as research tools to assist researchers in identifying links in characteristics between generations. For example, an ancestral hierarchy could be used to generate a series of "heat maps," each of which highlights a different characteristic. By scrolling through a series of such heat maps, the user can obtain a rapid understanding of which traits appear frequently or infrequently within a family, and which traits appear to follow a particular lineage within the family.

As an example of such searching, the ancestral hierarchies can be used to store information relating to environment, diet, diseases, genetic characteristics and the like. Such hierarchies can then be used for research, to help researchers store, sort and view the significance of data related to these factors in connection with various diseases and conditions. For example, searches can be done on the hierarchy to highlight individuals having a low fat diet and to highlight individuals having heart disease. The highlighting can be done both separately and as a linked characteristic. By scrolling between the resulting heat maps, the researcher can quickly visualize whether there appears to be a link between the two factors.

In addition to assisting in confirming a hypothesis about the linking of factors, the highlighting of two characteristics can also be used for data mining. For example, a user could highlight hierarchies according to a wide range of possible factors, then scroll quickly between the hierarchies in pairs to determine whether any pair displays a similar visual pattern, or "heat map." The visual display can also highlight records where two or more traits appear in combination. A large number of individuals appearing to have two factors in combination (resulting in a heat map with a large number of highlighted entries), can lead a researcher to develop a hypothesis that the two factors are linked. The researcher can separate the factors and highlight the hierarchy for each factor separately, to see whether the same records still appear, suggesting a strong link.

The highlighting of factors or combinations of factors in a linked hierarchy is not limited to ancestral hierarchies. Any hierarchical structure can be used, so that hypotheses about the nature of links in the factors that make up the hierarchy can be developed and explored using the visualization techniques disclosed herein. Multiple hierarchies can be used as filters as well. For example, an item can be highlighted if it appears in both of two independent hierarchies so as to assist the user in identifying dependencies or commonalities between the hierarchies. Similarly, the user could specify the priority of hierarchies. For example, by specifying that a first iPOV be viewed as secondary to a second iPOV, the UI can display the first iPOV with data matching the second iPOV. The resulting display can be considered a shading of that first iPOV, or a limited set of the second iPOV.

The methods and systems disclosed herein can permit users to integrate multiple points of view. For example, two different users can have differing views as to how to depict a hierarchy of certain data, or a user can have one or more iPOV's regarding a particular data set, depending on the user's frame of reference in looking at the data sets at a particular time.

Figure 4:
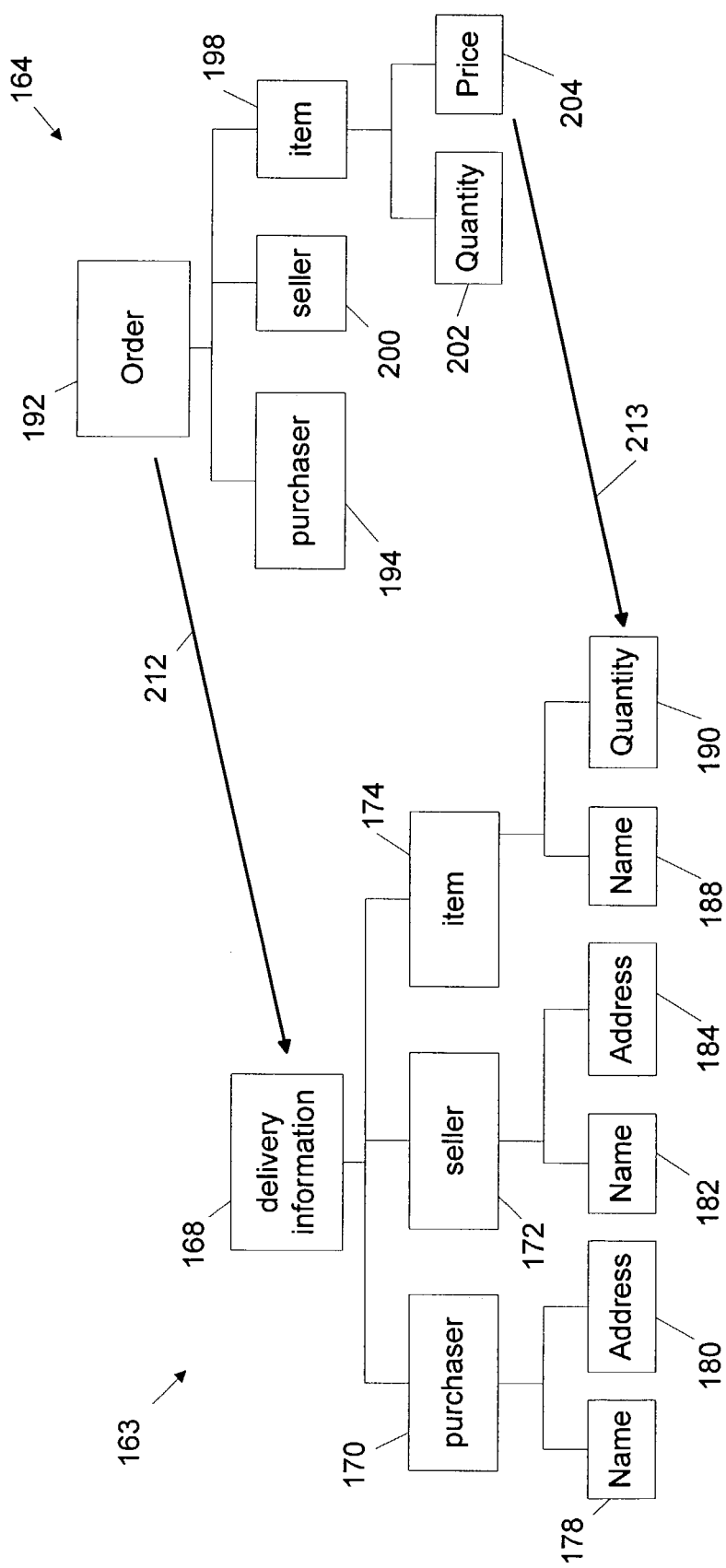
FIG. 4 illustrates hierarchical representations of delivery and order data.

By way of example, FIG. 4 can illustrate a delivery hierarchy 163 and an order hierarchy 164. The delivery hierarchy 163 can represent an iPOV related to delivery of goods from a seller to a purchaser. As illustrated in FIG. 4, the delivery hierarchy 163 can include a delivery information field 168, such as a record identifier, delivery number, or code for information pertaining to a particular delivery. A purchaser field 170 of the delivery hierarchy 163 can be broken down to include a purchaser name field 178 and a purchaser address field 180. A seller name field 172 of the delivery hierarchy 163 can similarly be broken down to include a seller name field 182 and a seller address field 184. Additionally, the delivery hierarchy 163 can include an item field 174, including an item name field 188 and a quantity field 190. The delivery hierarchy 163 can be used, for example, by a freight forwarder to determine a pick up address from the seller address field 184, the items to be delivered from the item name field 188 and the quantity field 190, and the delivery address from the purchaser address field 180.

The order hierarchy 164 can include information a seller can store in connection with an order, including an order field 192, such as a unique order identifier, record identifier, or the like, a purchaser field 194, a seller field 200 and an item field 198. The fields can be broken down into further fields, for example the item field 198 can be broken down into fields, including a quantity field 202 and a price field 204. Thus, a user of the order hierarchy 164, such as a comptroller, can store and structure basic information on order quantities and prices. The delivery hierarchy 163 and the order hierarchy 164 can represent different points of view for looking at similar, but not identical, information. The two hierarchies 163, 164 can both include information on the purchaser, seller, item and quantity. However, the delivery hierarchy 163 can include names and addresses of the purchaser and seller not included in the order hierarchy 164, and the order hierarchy 164 can include information on prices, not included in the delivery hierarchy 163.

In many situations, a user can wish to view information from different points of view. For example, if payment is to be obtained when making deliveries of an item, one can obtain the names and addresses from the delivery hierarchy 163 and the prices of the items being delivered from the order hierarchy 164. When both hierarchies are available are available to the user, the user can scroll between them for the user's different purposes.

To be able to search for different points of view generated by others, e.g., to determine how other users might view the same or similar data, the methods and systems disclosed herein can permit a user to search for other hierarchies that contain some of the same data as the selected hierarchy. Thus, a user having only delivery hierarchy 163 available can search a database of other hierarchies to find hierarchies that include at least one field in common with the delivery hierarchy 163. Such a search can retrieve the order hierarchy 164, because of the presence of at least four items in common, purchaser (170, 194), seller (172, 200), item (174, 198) and quantity (190, 202). If a search finds more than one hierarchy, the results can be ranked by a variety of techniques, such as weighting the hierarchy elements according to the level of the hierarchy in which they appear, weighting the hierarchies according to the number of elements in common, or the like.

Also, the user conducting the search can highlight particular terms for which he wishes to find hierarchies. For example, a user of the delivery hierarchy 163 can highlight the purchaser field 170 and the seller field 172 in conducting the search, which can retrieve hierarchies having those fields. The user can then scroll through the retrieved hierarchies and find those that assist the user in formulating a point of view for a particular frame of reference.

Based on the results of the search, a user can modify the original hierarchy used in conducting the search. In addition and/or alternatively, the user can integrate multiple hierarchies, whether found in the search or otherwise available to the user. The linking of the hierarchical structures can be accomplished by the user with a simple drag and drop of related hierarchy elements, such as boxes or fields, and lines reflecting logical significance. The lines and boxes represent not only graphical depictions, but code elements reflecting the logic of the hierarchies, as disclosed previously and further below.

Figure 5:
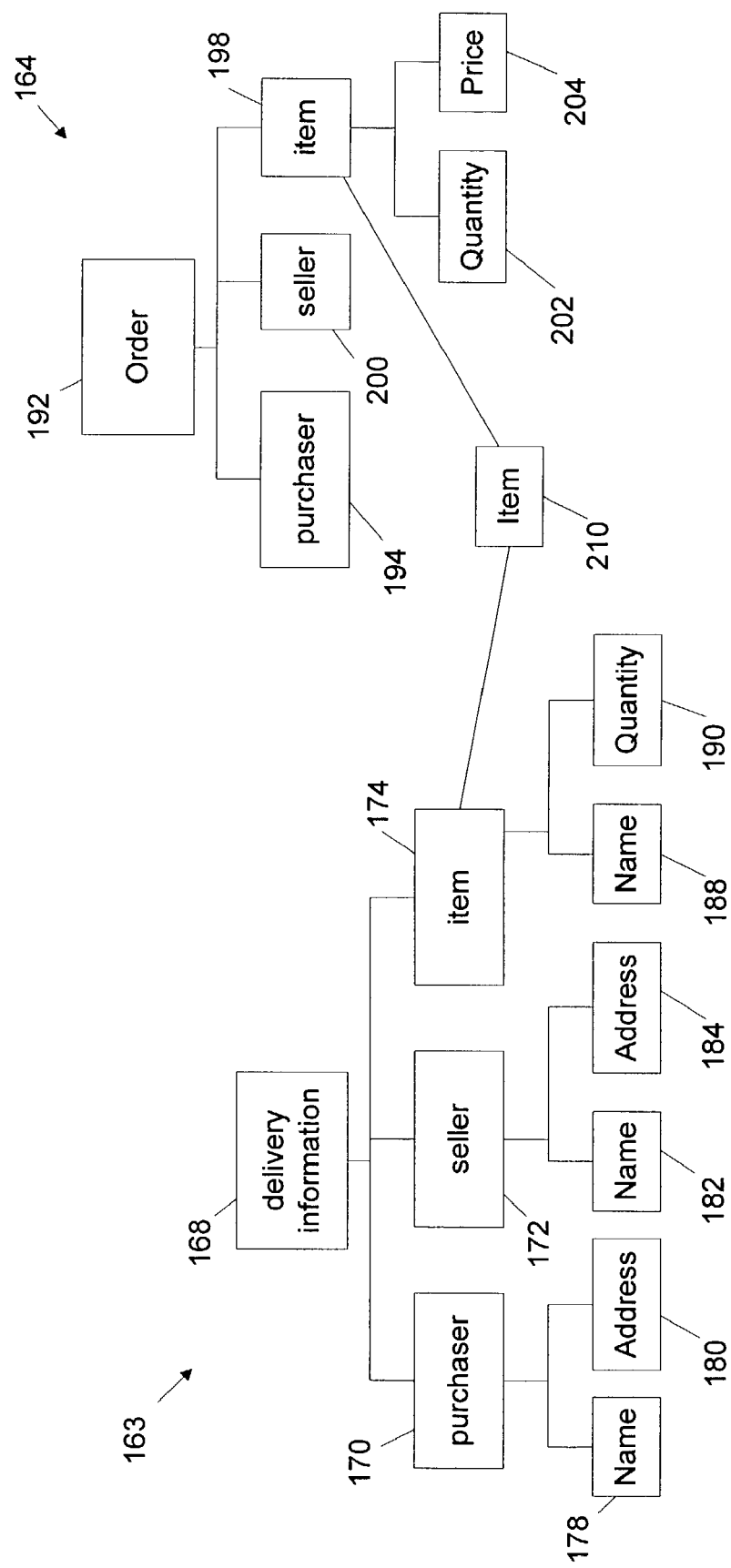
FIG. 5 illustrates a linked hierarchical representation of the delivery and order data of FIG. 4.

Multiple hierarchies can be integrated in a variety of ways, including identifying a bond, or link, between the hierarchies, so as to establish a common bond between them. For example, in the bonded hierarchy 208 of FIG. 5, the delivery hierarchy 163 and the order hierarchy 164 can be linked by a common element, the item field 210, which in turn can be linked to the item field 174 of the delivery hierarchy 163 and the item field 198 of the order hierarchy 164. The linking of the hierarchies in this manner can identify the item fields in the respective hierarchies as representing one and the same item.

Additionally, multiple hierarchies can be integrated by adding elements from one of the hierarchies to the other in appropriate locations. For example, referring to FIG. 6, items in common between two hierarchies that contain additional sub-elements can be integrated into a single hierarchy that contains all of the sub-elements. Thus, in FIG. 4, the delivery hierarchy 163 can be identified as missing the order field 192 and the price field 204 from the order hierarchy 164. The order field 192 can be identified as appearing on the same level of hierarchy (one level above the common set of purchaser-seller-item) as the delivery information field 168. The price field 204 can be identified as appearing at the same level as the quantity field 190 (one level below the item field 174).

Figure 6:
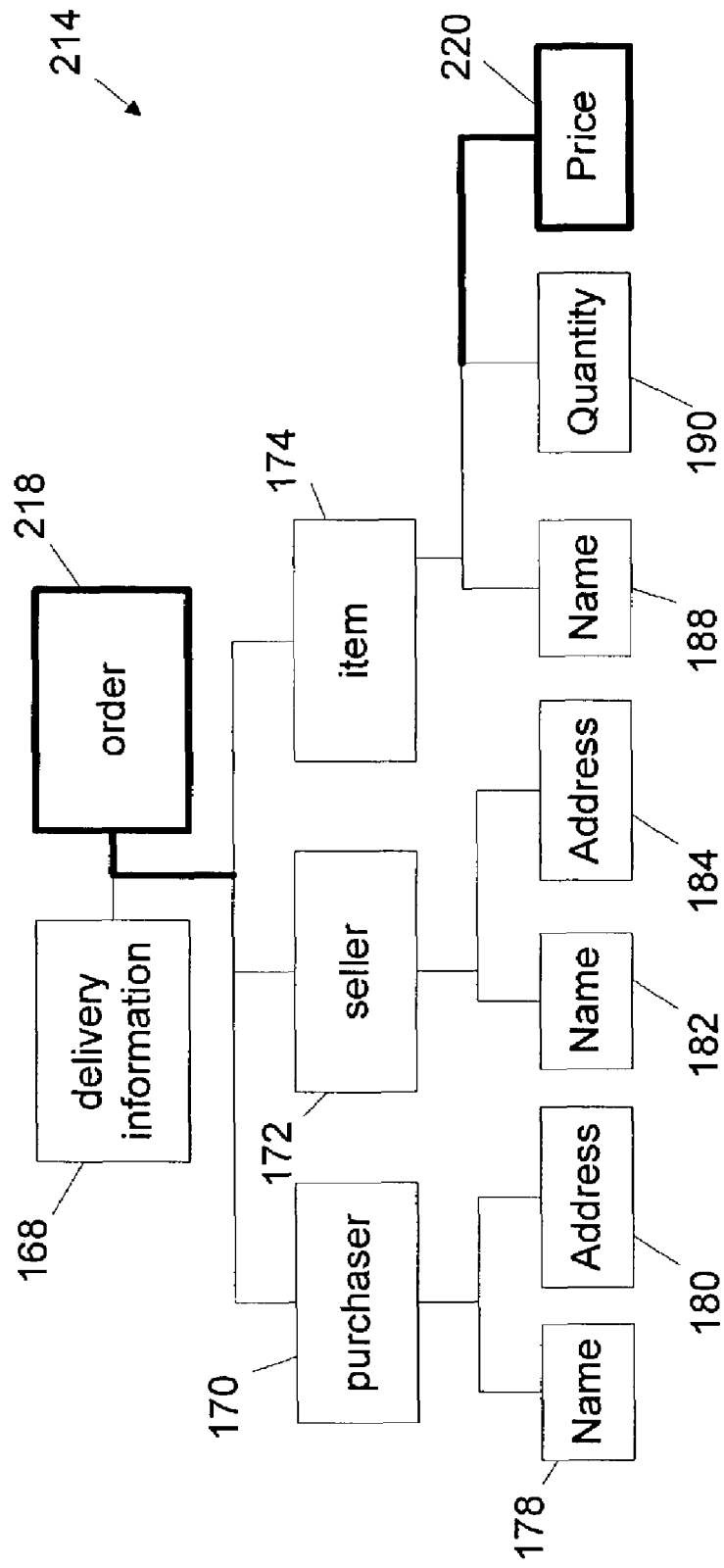
FIG. 6 illustrates the integrated hierarchical representation of the delivery and order data of FIG. 4.

Arrows 212 and 213, respectively, shown in FIG. 4, can reflect the desired movement of the order and price hierarchy elements from the hierarchy 164 into the appropriate place in the delivery hierarchy 163. FIG. 6 depicts the resulting hierarchy 214, reflecting the integrated point of view, with the new elements highlighted in bold. Thus, hierarchy 214 can include a price field 220 and an order field 218, and structural elements 222, 224, respectively the connection of the fields 218, 220 in the hierarchy 214.

The integration of fields from multiple hierarchies can include automatic integration and integration accomplished by user input. In the automated embodiment, the systems and methods disclosed herein can recognize hierarchy elements in common, such as the purchaser-seller-item structure appearing on the same level in the delivery hierarchy 163 and the order hierarchy 164. Once elements in common are recognized, the two hierarchies can be merged so that all of the elements of each hierarchy appearing at levels below the common structure can be included in a single hierarchy. As previously noted, the hierarchies can represent the underlying code that can reflect the logical significance of the particular hierarchical structure. The integration of multiple hierarchies can also be made in a master-servant relationship. For example, the user can identify a "master" hierarchy, and the other or "servant" hierarchy can be automatically modified to remove structures, nodes, and the like not present in the "master" hierarchy.

The systems and methods herein can rank one component, e.g., a person within a large group of changing components or people. Based on the confidence levels determined for the components, an overall confidence score can be obtained by carrying the scores upwards to the highest level of the hierarchy to which the components belong. To determine a ranking, the system can determine the community of components that are the peer group for the category. Since the system can save component scores for categories, the system can find the component scores that resulted in the category scores for the component of interest. The system can query the connections database and find the community of components related to a particular category. Once it has this list, the system can locate a member of the community having similar component scores and can assign the component of interest the similar component's peer-ranking score.

Back-End

An embodiment of the systems and methods disclosed herein can include, in addition to the UI, a back-end component that performs data storage and manipulation functions, including the following, described more particularly below: Rule-Based Suggestion for Searching and Integration, Platform for Pattern Matching, Similarity Analysis, Special Matching with Index Structures, Special Hierarchy Database Structures, and Non-Identical Matching.

Figure 7:
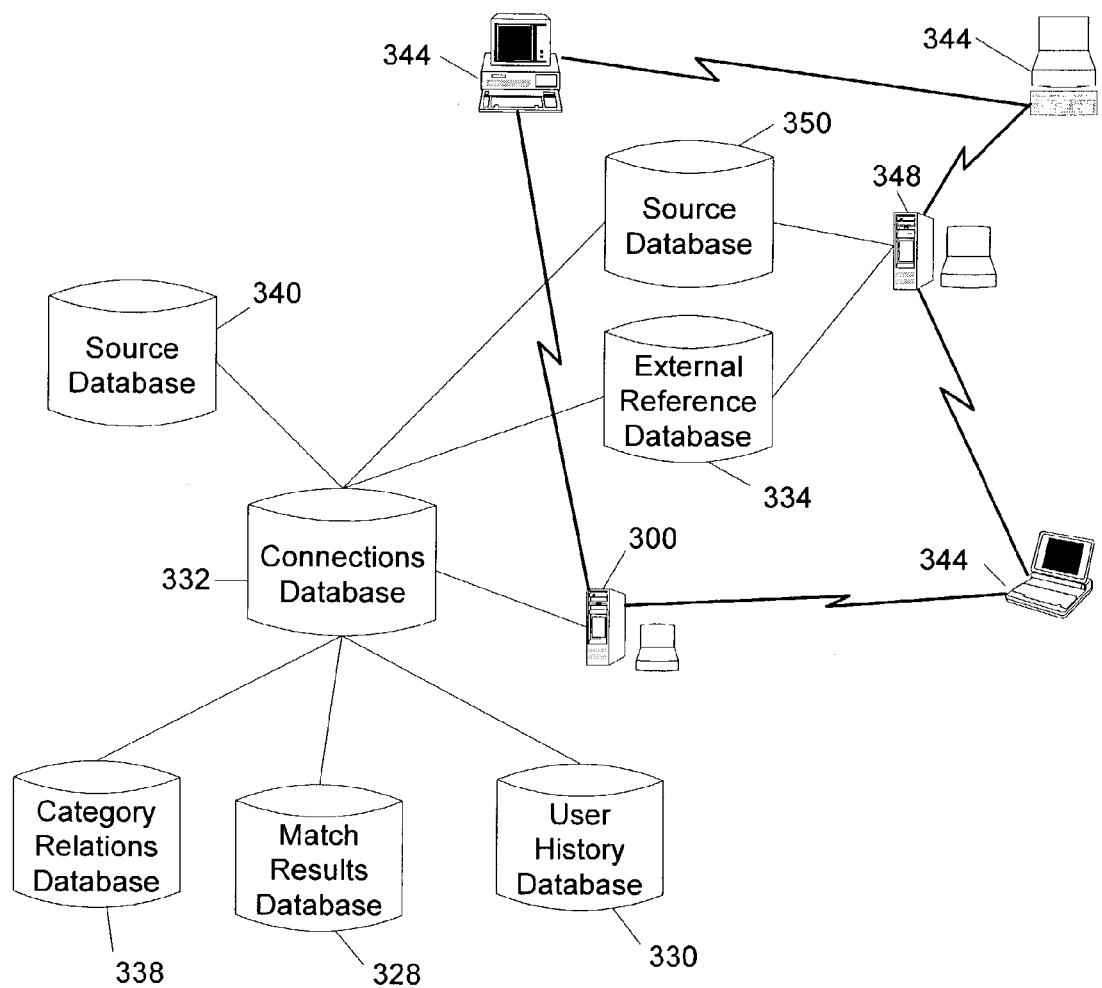
FIG. 7 illustrates a block diagram of one embodiment of a system for manipulating data using hierarchical data representations.

Referring to FIG. 7, high-level components of a system for providing the capabilities disclosed herein can be illustrated. In the exemplary embodiment of FIG. 7, a network-based host system 300, which can include one or more servers or other network-connected computers, can connect to a communications network 342, e.g., the Internet or other network, to which can be connected one or more client devices 344. Client devices 344 can interact over the network 342 with the host system 300 and can include desktop computers, laptop computers, workstations, or other devices. In an embodiment in which the network 342 is the Internet, the client devices 344 can be equipped with browsers or similar devices capable of communicating with the server or servers of the host 300 using an Internet protocol, such as TCP/IP. Thus, the browsers on the client devices 344 can read HTML pages and provide various graphical UI functions. In this embodiment, the computing functions can be provided primarily by the host system 300 in interaction with various databases and the client devices 344 can be used primarily for user input and display of results forwarded by the host system 300.

Figure 8:
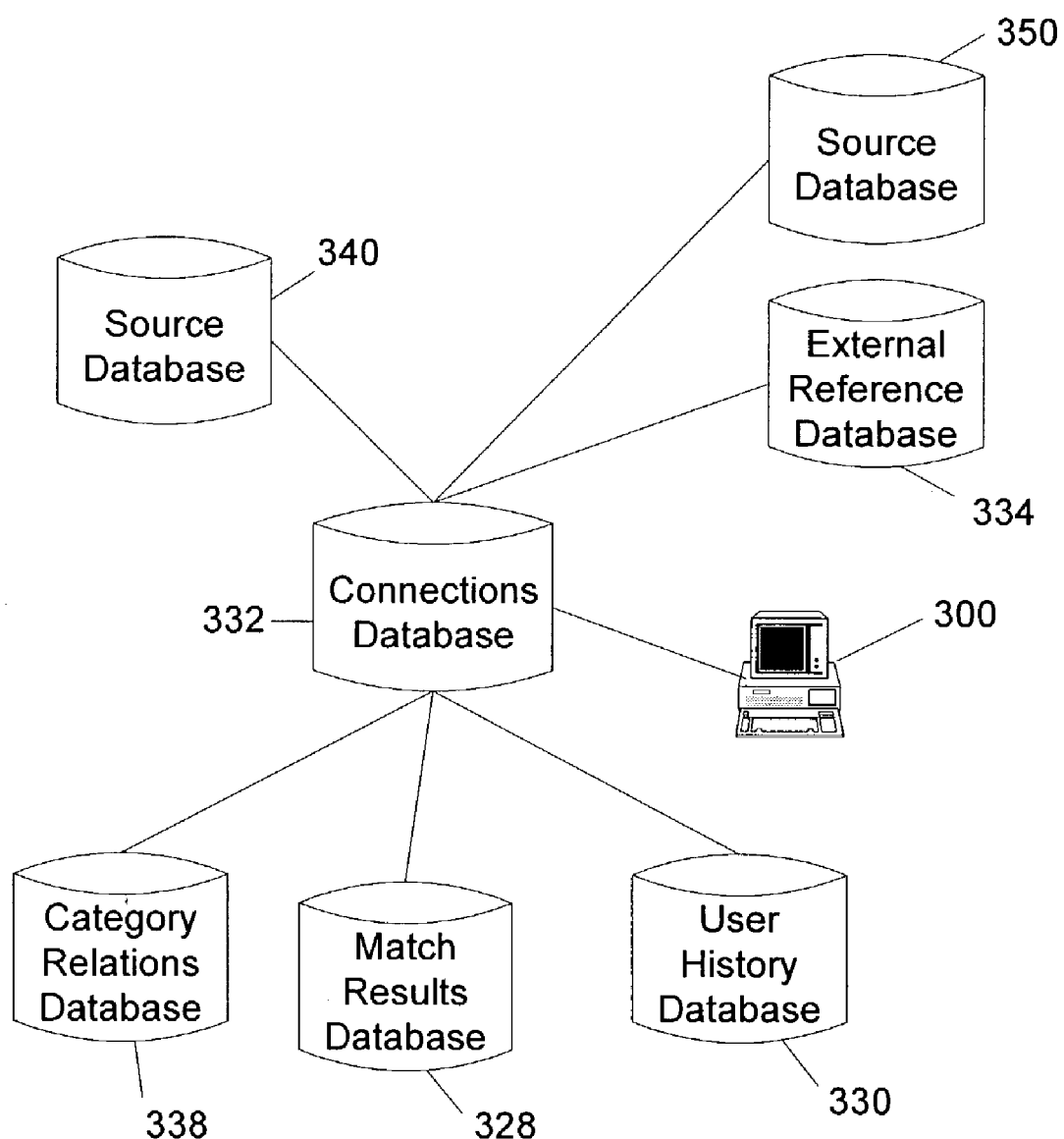
FIG. 8 illustrates a block diagram of another embodiment of a system for manipulating data using hierarchical data representations.

FIG. 8, can illustrate host system 300 in a standalone environment. For the embodiment of FIG. 8, the host system 300 can include a personal computer, desktop computer, laptop computer, notebook computer, workstation, mainframe computer, or other computer having a user interface capable of supporting a graphical user interface and database applications. It can be understood that various functions ascribed to the host 300 in the network embodiment of FIG. 7 can be accomplished by client devices 344 configured in the manner of the host 300 of the standalone embodiment of FIG. 8, e.g., the computing functions can be distributed as desired between a host 300 and the clients 344.

The following description of the host system 300 can be applicable, except where indicated otherwise, to both a network embodiment as in FIG. 7 and in a standalone environment, such as in Fib. 8. Referring to FIGS. 7 and 8, the host system 300 can connect to a plurality of databases, including a connections database 332, a plurality of source databases 340, 350, an external reference database 334, a category relations database 338, a match results database 324 and a user history database 330. For the sake of simplicity, FIGS. 7 and 8 can depict the various databases, as being connected through the connections database 332.

The connections database 332 can include data indicating how categories of interest to the user can be connected to additional categories, as described in more detail herein. The source databases 340, 350 can include databases that the user can search for data meeting the user's search criteria. The external reference database 334 can include a source database that can be considered an authority in its respective field. The category relations database 338 can include definitions for the categories in the connections database 332, the definitions based on the four set definitions described previously in relation to the relativity database. The match results database 324 can include temporary storage for search results and the user history database 330 can include data for tracking use of the systems and methods herein.

It can be understood that the various databases can connect to each other directly in order to facilitate transfer of information between them. It can also be understood that the particular databases depicted in FIGS. 7 and 8 are selected for purposes of illustration and that other databases, or subsets of these databases, can be provided with the host system 300. Also, one or more of these databases can be combined with another to provide a combined database with the functions of the constituents. Also, multiple databases can exist with any given function; e.g., there can be two or more category relations databases 338, depending on the needs of the system.

Figure 9:
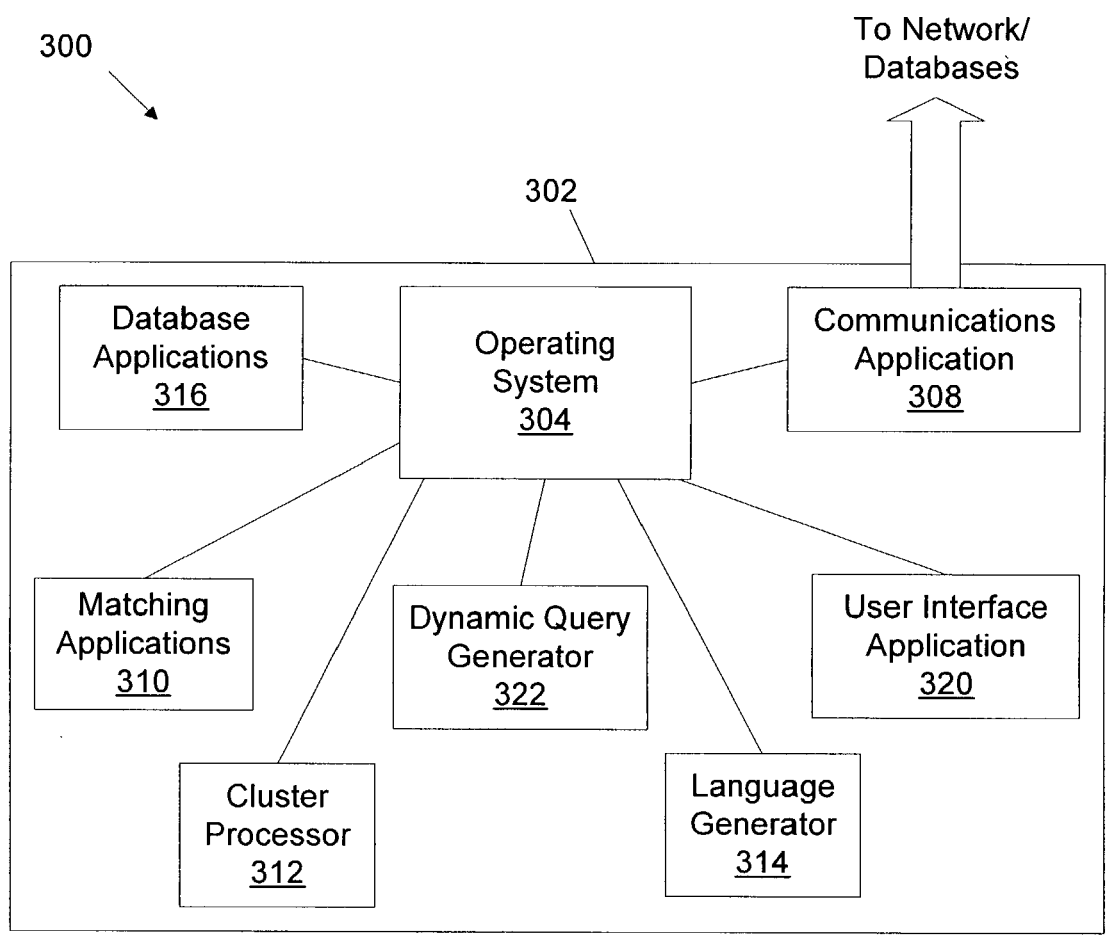
FIG. 9 illustrates a block diagram of a processing component for use with the systems of FIGS. 7 and 8.

Referring to FIG. 9, a schematic diagram can illustrate components for providing capabilities of the host system 300. The host system 300 can include computer 302, e.g., can be a server or other computer. The computer 302 can include an operating system 304, which can govern various application programs. The application programs can include a user interface application 320, a communications application 308, a dynamic query generator 322, a language generator 314, a cluster processor 312, one or more other database applications 316, and a matching application 310. Other applications can also be included with the host system.

The user interface application 320 may be used by a user of the host system 300 to interact with the host 300 system to execute various other applications. For example, the user interface application 320 can be used initially to set up the system, to bring data into the databases, to manage user accounts, and the like. In addition, user interface application 320 can implement the UI described previously.

The communications application 308 can include communications applications capable of supporting communications between the host computer 302 and the network 342. Thus, the communications application 308 can provide the functions of an HTTP server or similar device. The communications application 308 can also parse TCP/IP messages received from the client devices 344. The matching application 310 can be one or more applications for performing matching between a query and a database, including tools for ranking database records according to term frequency, inverse document frequency, and the like.

Figure 10:
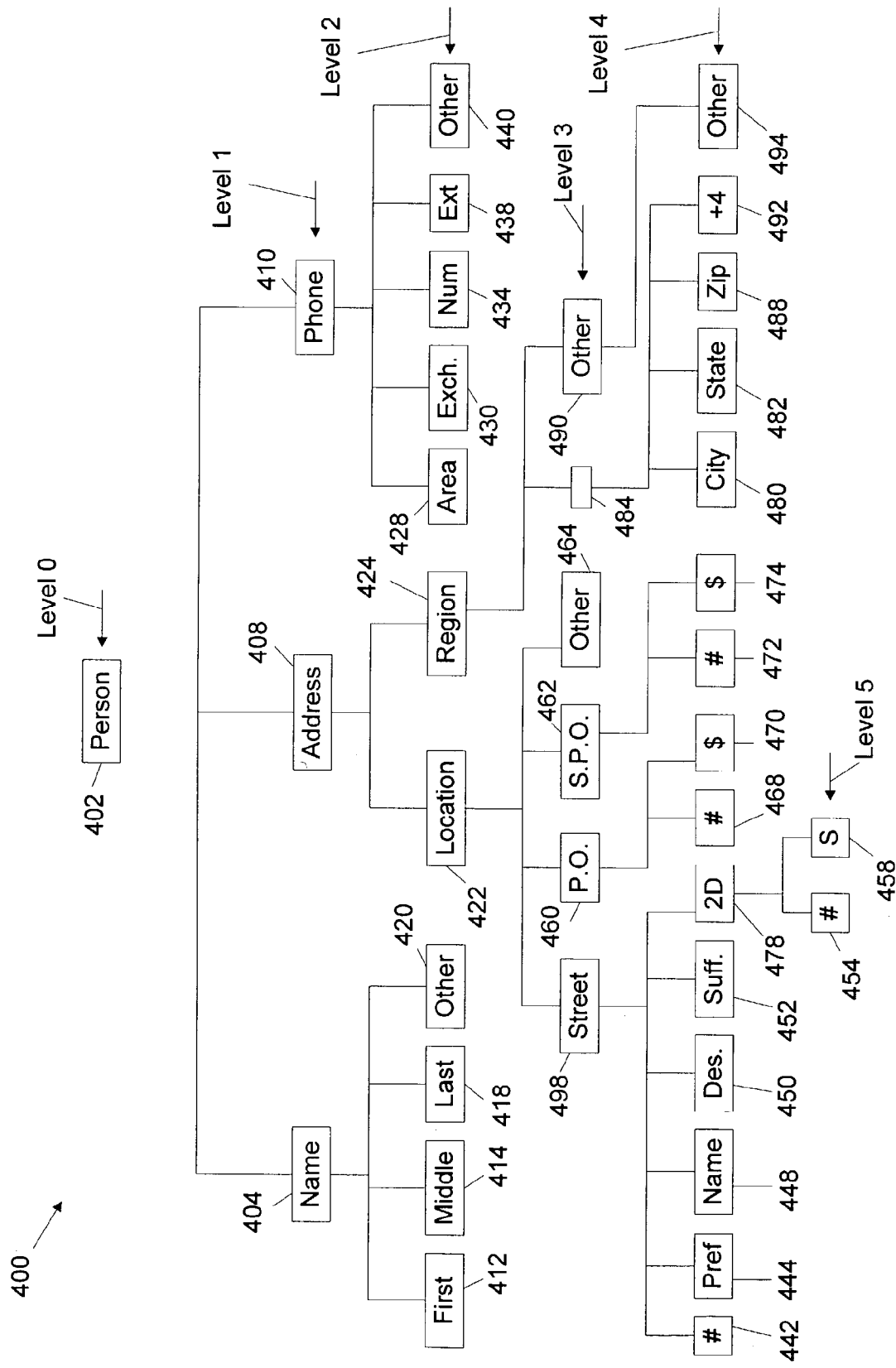
FIG. 10 illustrates a hierarchical representation of data related to a person.

As previously described, the systems and methods disclosed herein can permit searching using hierarchies. The systems and methods can take advantage of data structures that place elements into hierarchies having identifiable levels. Referring to FIG. 10, a schematic representation of an eBOK 400 for data relating to a person 402 is illustrated in schematic format. A related hierarchy 100 can be displayed in the user interface of FIG. 2A described above. In various applications, searches can be conducted of a database to determine what data the database includes that can be related to a particular person. In order to conduct such a search, the person to whom the hierarchy relates can be matched to data in the eBOK. Such matching can also be useful for a variety of other purposes, including cleansing databases of duplicate records for the same person, matching records from diverse databases related to the same person, and the like.

An eBOK such as the eBOK 400 of FIG. 10 can include a number of elements. Thus, an element 402 can be provided for the highest level, which can include a unique data record identifier or similar mechanism for identifying the particular eBOK 400. For the exemplary eBOK 400 of FIG. 10, element 402 can identify eBOK 400 as a "person" eBOK. The eBOK 400 can also contain a number of levels, reflecting increasing granularity of the data relating to particular aspects of the data for the person. Thus, if the level of the element person 402 is at level zero, then at the next level down, level one, information can include a name element 404, and address element 48 and a phone element 410.

The name element 404 can be broken down to the next level, level two, into a first name element 412, a middle name element 414 and a last name element 418. The address element 408 can at level two, include a location element 422 and a region element 424. The address element 408 can contain a number of other elements at different levels, such as, at level three, a street element 498, a P.O. box element 460, and a special P.O. box element 462. The street element 498 can be broken down at level four to include a street number element 442, a prefix element 444, a name element 448, a designator element 450 (such as "boulevard"), a suffix element 452 and a secondary name element 478. The secondary name element 478 can include further elements at level five, such as a number element 454 and a string element 458, representing a string of characters.

Level four can also include a number element 468 and a string element 470 below the post office box element 460, as well as a number element 472 and a string element 474 below the special post office box element 462. The region element 424 at level two can also include sub-elements, including a node element 484 at level three, representing an empty level that can include further elements at level four, namely, a city element 480, a state element 482, a zip code element 488 and a "plus four" element 492, for the last four digits of an expanded zip code. The phone element 410 at level 1 can include, at level two, an area code element 428, an exchange element 430, a number element 434, and an extension element 438.

The elements in the eBOK 400 (including the connecting links between elements and the levels of the elements) can be assigned unique codes, so that the elements can be identified in processing, along with their location in the eBOK relative to other elements. Elements, or groups of elements linked into structures, can thus be assigned hierarchy identifiers, so that they can be established as reusable components for different points of view. Structural elements, such as the node 484 can also be stored for reuse in other eBOKs that have the same logical structure but different data elements.

Once established with elements and levels, such as the eBOK 400, an eBOK can be used in matching to a data set, e.g., in matching a person to records for a name. The last level down in which data appears for a branch of a hierarchy can be described as a "leaf node" of that hierarchy. A particular hierarchy can have different leaf nodes, depending on the number of levels of significance specified by the user. In order to conduct matching, a user of the systems and methods described herein can input an existing eBOK, such as a person eBOK, and the systems and methods can add qualifiers to the eBOK. In particular, the systems and methods can establish, in the connections database 332, an "other" element at the same level as the leaf node for branches of the eBOK.

For the exemplary embodiment of FIG. 10, the "other" elements established for the eBOK 400 include "other" element 420 appearing at level two for the name element 404, "other" element 490 appearing at level three below the region element 424, "other" element 494 appearing at level four and "other" element 440 appearing at level two below the phone element 410. The user can specify a level as a leaf node, denoting interest in an element of the eBOK only to the level specified. For the exemplary embodiment of FIG. 10, the user can specify interest in the location element 422 down to level three. Thus level three can serve as the leaf node for location element 422 and "other" element 464 can appear at level three below the location element 422.

The matching of the eBOK 400 to a data set can be based on calculations that make use of a number of variables. The variables can include a variable "L", defined as the number of levels down in a particular eBOK that data appears. For example, for the eBOK 400, data for phone element 410 can appear at level two, thus L=2 for element 410 of eBOK 400. The variable "N" can be understood to encompass the number of non-exclusive categories appearing in the hierarchy; including categories in which data can appear regardless of whether the data appears in another category.

The variable "E" can be understood to encompass the number of exclusive categories, including categories in which if data appears, it cannot be in another category. In accomplishing the matching, a significance and interest calculation can be conducted based on these variables and the elements in the eBOK. For example, "name" score can be calculated as follows. First, it can be recognized that the eBOK 400 can be stored in the connections database 332 with the "other" element 420 added to the eBOK 400. The system can look in the names in the database, file or other item being searched and can create a result table containing a string with scores of significance and interest for each item of data. The "other" element 420 can capture fields in the database, file, or item being searched other than the first, middle and last fields (412, 414, 418). If the element "other" is found frequently, indicating that items in the data were found but not accounted for, then the user can assume that various items in the database are not accounted for in the hierarchy.

In the case of name matching, the leaf node level two can include three exclusive boxes e.g., the first name cannot also be the last name. Thus, the variable "E" can equal three in the example. The name score can then be determined to be $$\frac{A}{E} + \frac{B}{E} + \frac{C}{E}$$

where A, B and C can represent the confidence level for the match between the name in a query to a name searched. The system can be tuned by establishing a threshold confidence score for identifying a match. Thus, if the total score is less than the threshold, then it can be shown as no match. The discussion with respect to FIG. 2A can provide additional description and information related to uneven distribution of coefficients to A, B and C, including weighting based on interest values.

Matching of particular elements can be done in a variety of ways. For example, in addition to identical matching, the system can support alternative types of matches, such as nicknames, phonetic matches, alternate spellings, misspellings, and transpositions of letters. As described in further detail hereafter, the connections database 332 Can include "near lists" which can provide degrees of matching based on various characteristics of the element being matched.

The methods and systems disclosed herein can also conduct a frequency analysis with respect to a frame of reference. For example, the systems can examine particular data sets, or subsets, to determine the frequency with which a particular element, such as a name, appears within the set as a whole, or within a subset. The system can thus establish standard deviations between a name and a reference data set. Confidence levels can then be adjusted (within subsets of the population) based on the standard deviations for the name. Confidence levels can also be adjusted based on factors, such as frequency of a term in a reference data set.

Additionally, confidence levels can be adjusted by the user, based on knowledge, or the user's point of view. For example, a user can recognize a name as being common within an ethnic population and thereby increase the confidence applied to a particular element. Conversely, the significance attached to the element can be lessened, e.g., a particular last name can be common in an ethnic population, such that a match of a first name can become more significant than a match of a last name.

The systems and methods herein can perform exhaustive searching in a variety of ways. However, but in order to save processing time, it can be desirable to do non-exhaustive searching. For example, the system can stop searching lower levels of data if no matches are found in elements at the next higher level. Confidence scores for a particular match can also be adjusted based on a string analysis between two factors. For example, the confidence score for a hierarchy element having a string with a large number of common letters in the same positions as a string of a data element from the database can be increased for that hierarchy element.

A user can also adjust the level of interest the user wishes to apply to elements within a level. For example, if the user is particularly interested in last name element 418, the user can add coefficients to the elements of the name score calculations, with the highest coefficient being applied to the last name element 418. Upon adding such coefficients, the system can adjust the name score formula to normalize for the new factors. Based on searches, learning, other points of view, or other factors, the system can suggest (or automatically initiate) changes in the coefficients. For example, as changes to an external data set change standard deviations relative to the external data set, the confidence scores for particular elements based on the standard deviations can change. Confidence scores can also be adjusted to reflect an assessment of the degree to which an item is known. For example, an item can be identified as "strong known," "strong," "weak" and "weak unknown", with corresponding by decreasing confidence scores.

Another example of matching with structured data sets can be based on a user's iPOV. The user can apply a significance level "S", and an interest level "I" to the items in a hierarchy, as described previously. Since there are different levels of non-exhaustive searching possible within the system, the system can be configured to do a more exhaustive search for items identified as having greater significance. For example, a maximum value for S can represent three levels of exhaustive searching for a particular element of a hierarchy, while an intermediate value for S can represent one level of exhaustive searching for another element. A higher S value for an element of a hierarchy can also be used as a trigger to establish a higher threshold level for determining that a match of that element has occurred in a search, since a high significance can be more important that all of the indicate that a more exact match can be desired. Thus, a higher significance value for an element leads to a more exhaustive, but more demanding, search for a particular element.

For example, if the user is attempting to match records in a database for a particular person, then a high significance might be placed on an address. Thus, the address may be searched down to level four, rather than level three as previously described. If the person's address is 575 6th Avenue, the higher threshold level resulting from the high significance can result in a match being determined when each of the elements "575", "6th" and "avenue" are found in the database record, file, or the like, that is being examined.

A user may also customize a search by varying the interest level, "I," for particular elements in a hierarchy. Like the variable S, the variable I can be varied by the user within a specified range. If the interest level is high, then the threshold for determining a non-identical match of a particular element can be set lower. Thus, items of high interest can lead to more possible data points for examination within the search results, although some of the retrieved "matches" can in fact not correspond to desired data. For example, high interest in the phone element 410 can result in matches for phone numbers with, say, at least two digits of the exchange matching. Thus, for a 357 exchange, the system can return matches for "x57", "3x7" and "35x" exchanges.

The four possible combinations of the interest level I and the significance level S can be seen in the following Table 1.

TABLE 1

Significance and Interest

| | INTEST LEVEL HIGH | INTEREST LEVEL LOW |
|---|---|---|
| SIGNIFICANCE LEVEL HIGH | Exhaustive Search Low Match Threshold | Exhaustive Search High Match Threshold |
| SIGNIFICANCE LEVEL LOW | Non-Exhaustive Search Low Match Threshold | Non-Exhaustive Search High Match Threshold |

Where both the significance level and the interest level are high for an element, an exhaustive search can be conducted with a low match threshold, resulting in the largest possible accumulation of data (match candidates) for the element. Where the significance level is high, but the interest level low, an exhaustive search can be conducted, but the matching threshold is higher, resulting in fewer matches than in the previous case. Where the significance level is low, but the interest level is high, non-exhaustive searching can be performed (at a level corresponding to the significance level), with a low match threshold. Finally, where both the significance level and the interest level are low, non-exhaustive searching with high match thresholds can be performed.

The ability to vary significance and interest levels within a hierarchy representing a user's iPOV can allow the user to tune searches to reflect the user's current views as to the significance and interest level of elements appearing in the iPOV, in terms of matching records from databases, files, or the like to that point of view. Thus, the user can have a customized focus for looking at data. Over time, the user can adjust significance and interest levels to obtain higher quality search results.

Where data is unstructured, significance and interest calculations based on levels can be more difficult. In that case, matching and weighting can be based on string manipulation, using inverted indices based on term frequency, inverse document frequency, and the like, as in natural language searching algorithms known to those of ordinary skill in the art. In cases of unstructured data, a distance function can be established, based on the percentage match between a word and another word. Thus, words can be determined to match, or not to match, based on a threshold of percentage similarity. The degree of similarity for words determined to be a match can also be given a confidence score, for example between one-hundredth and one, to assign a degree of confidence to the quality of the match.

The connections database 332 can assist in determining distance between words. The connections database 332 can include a plurality of words assigned predefined "distances," or degrees of matching, based on a variety of characteristics, including etymology, or root word similarity, similarity in meaning based on dictionary or thesaurus meanings, or the like. Words can thus be stored in clusters, with "close" words in terms of meaning and relatedness being stored in the same cluster. The clusters can be built by human analysis using the cluster processor 312, or by use of inverted indices, such as those available with known databases.

The connections database 332 can also store metadata related to the structure of the database, including hierarchy structures that relate to a particular word, such that unstructured data sets can be searched. The hierarchy structures can be taken from frequently occurring data or structures within the database and can then be stored in the connections database 332. Among other things, the connections database 332 can store repetitive structures with associated identifiers, as well as pointers to records for a particular person in various databases. The connections database 332 enables a user of a hierarchy to recognize weighted contributions within a data set to a particular hierarchy. The key components of the connections database 332 include key field analysis, attributes of keys, time series fields and classification fields. The connections database 332 can be organized according to these components.

In an embodiment, an artificial intelligence algorithm, or program can look at a results table for a matching search described above and seek explanations for why a match occurred. Once identifying the reason for a match, the program can improve the search performance by placing additional significance on the matching elements. The key fields may link data with metadata. Thus, in the UI previously described, a key field may be underlined or otherwise highlighted to identify it as a key field.

Systems and methods disclosed herein can permit similarity analyses of different hierarchies or structures stored in the connections database 332. In this process, hierarchies can be compared in pairs and a score can be established that permits ranking of pairs of hierarchies as being more or less similar to each other. As discussed above, elements of hierarchies, as well as sub-hierarchy structures, can be given unique identifiers, so that the sub-hierarchy structures can be identified and reused. The similarity, or cluster, score of a comparison of two hierarchies can thus be increased if the two hierarchies share the same nodes, or substructures. The value of a similarity score can be further increased if the nodes appear at the same level in a pair of hierarchies, or if the nodes appear in the same order. Hierarchies that have high similarity scores (with a threshold identified by the user), can be stored together as clusters of hierarchies relating to the same subject matter.

The systems and methods described herein can log, with respect to a query that results in retrieval of a hierarchy, that a particular hierarchy was used. Thus, hierarchies that respond to the same query can be clustered as relating to similar subject matter, at least with respect to the response to that particular query. Once a cluster is established, a user can scroll through a cluster of hierarchies as a way of expanding the user's point of view. If desired, as described above, the user can modify the user's iPOV, or integrate it with an iPOV represented by one or more of the clustered hierarchies. A hierarchy structure can also be compared to a data structure, both in terms of the data and the operators that operate on the data.

Systems and methods disclosed herein can store items of interest in temporary structures to support a search and can retain the temporary structure if frequent searches on the same type of information are logged by the system. Those of skill in the art of database management can recognize that there are many ways to break down a sparse matrix of information into the standard database structures of tables and indexes, so as to build indexes and table structures on demand to optimize the function of an application.

Bonded hierarchies can include search properties not found in other hierarchies. For example, hierarchy 130 of FIG. 3 can be a bonded hierarchy with the focus on person 148. By changing the focus to father 144, the information relative to mother 142 can be dropped, including maternal grandmother 132 and maternal grandfather 134. Sibling information related to the father can now be displayed.

The other special case of manipulation includes linking hierarchies to directly specify a connection between data sets. The research hierarchy allows one to see the differences between data not being matched but still of interest to the application doing the matching.

Non-identical matching can take place for a leaf node of a hierarchy item. If the connections database 332 contains no greater information for performing the non-identical matching then performed based on the known datatype of the item. If the datatype is not known a sample of data is drawn and a datatype is asserted for the category item.

Figure 11:
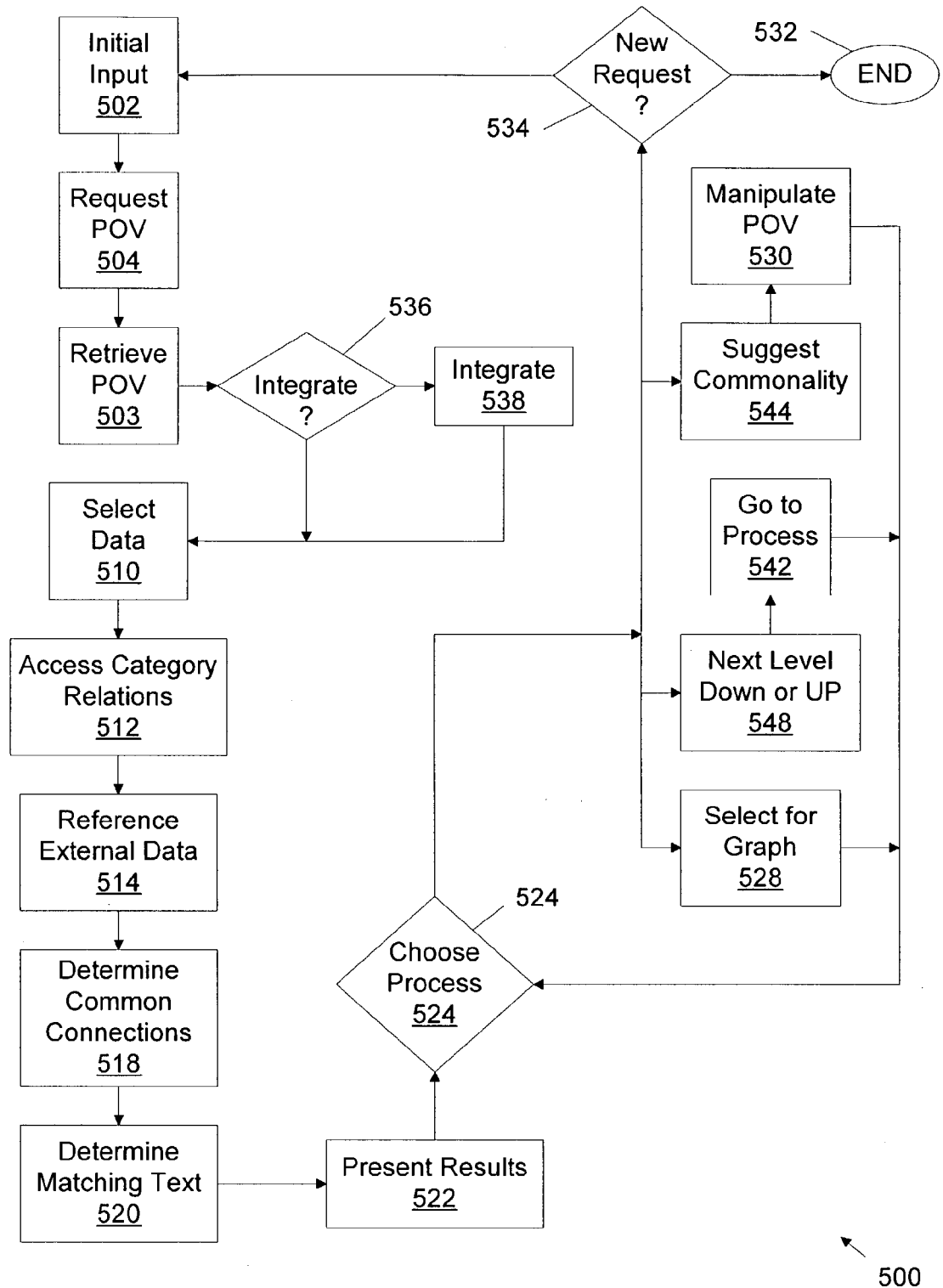
FIG. 11 illustrates a flow diagram of a method of implementing the systems of FIGS. 7 and 8.

Referring to FIG. 11, a flow chart can depict a flow chart of a method 500 of implementing a user request or search. First, at 502, the user can enter initial input. For example, the user can enter a query as a text string, or can enter categories of interest for a query, such as "Salmon Population, U.S. Region." As requests can be performed based on a user's point of view, frame of reference, or subset of frame of reference, the user can enter an identifier for, or otherwise select, an iPOV as the initial input. Inputs can also include an HTML template, a Java applet, a sound, an image, a text input, an xWindows input or a LISP interface input, among others. The input could also be a hierarchy.

At 504, the system can generate a query and obtain match results for the query. The dynamic query generator 322 of FIG. 9 can recognize the query as formatted for a particular type of request. The dynamic query generator 322 can be constructed to be capable of providing database requests to databases or files in a variety of formats. For example, if the referenced item is HTML, then the dynamic query generator 322 can parse the HTML, if the reference is a database, then the dynamic query generator 322 can use SQL commands for the database, if the reference is a file, then the dynamic query generator 322 can include capability to request a file. Tools known in the art for parsing HTML, generating SQL commands and requesting files can be implemented by the dynamic query generator 322.

The system can look for patterns in the databases, including hierarchies for which the input is a component, or for which there is a similar component. A variety of matching means can be used, as disclosed above, including matching based on similarity patterns, significance and interest, or matches based on difference logic and decision processes. The match can be conducted through the dynamic query generator 322 of FIG. 9, or through a similar mechanism. The matching process can execute on a variety of different databases, such as one or more source databases 340, 350, one or more external reference databases 334, or the connections database 332.

The matching process at 502 can also refer to the category relations database 338, which can contain categories for match results, data related to clustering of hierarchies, and information relating to instances of data within the connections database 332. The category relations database 338 can provide a two-dimensional cut of with a series of header information regarding how a particular hierarchy in the connections database 332 can fit into a categories.

The system can return an ordered set of recommended hierarchies at 503 and can display, through the UI, one or more of the ordered set to the user. If more than one iPOV is returned, the user can view multiple hierarchies or can scroll or tile between iPOV's, depending on the user's selection, the complexity of the iPOV's and/or other hardware or software considerations, as may be known in the art. The order of the list of hierarchies can be based on the relevance score obtained from the matching process. At this point the user may be given a choice, at 536, of whether to integrate one of returned iPOV's with the user's iPOV, as at 538, and as described previously above.

For example, the user can highlight the unique identifier of the section of the hierarchy to be integrated, right click on the mouse, and drag the section to the appropriate part of the user's iPOV. The user can also be offered lists, such as attribute lists, category lists, and point of view lists, reflecting levels of items that can be added to points of view at any desired level. For example, the user can ask for attributes from a data source that can be absent from the user's iPOV. When one of these items is selected, the connections database 332 can perform matching between elements in categories and the elements in the user's iPOV. The system can collect unique identifiers for structures within the user's iPOV and match those to categories in the category relations database 338 for those structures. The matching can also identify "close" or "distant" category relations and establish thresholds for determining a matching category. The data source can also include metadata for data in the database that identifies matching categories. After integration at 538, or if the user chooses at 536 to integrate, the user can select data and/or categories at 510 on which the search can be based.

The method 500 can access 512 the category relations database 338 of FIGS. 7 and 8 to determine relations between the data and/or categories selected. Using the determined relations, the method 500 can reference external data 514 and determine common connections 518 with the data and/or categories selected at 510. Using data sets based on the data selected, and common connections with the referenced external data, the method 500 can determine matching text in one or more source databases at 520 and the results can be presented to the user at 522. As previously described, the results can be presented in the form of hierarchies with components of the hierarchies for which matches were found being highlighted or otherwise differentiated from other components.

The user can then choose 524 among a number of processes for viewing and/or analysis of the results, including selecting data for graphing 528, viewing various levels within the presented data or hierarchies 548, and suggesting commonality 544. When a new level is presented the user can be returned at 542 to choose a process for viewing and/or analysis of the results at that level. When the user chooses to suggest commonality at 544, the user can manipulate the displayed hierarchy 530, or iPOV to choose those components for which the user is interested in determining commonality. It can be seen that the method 500 can return the user to the choice of process 524 after selecting graphing 528 and after manipulating 530. The user can choose at 534 to perform additional searches by returning to input 502, or can end the method 500 at 532.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

Although the methods and systems have been described relative to a specific embodiment thereof, they are not so limited. Obviously many modifications and variations may become apparent in light of the above teachings.

What is claimed is:

1. A computer program tangibly stored on a computer-readable medium and configured to cause a computer to enable a user interface for encoding a graphical representation of an individual point of view (iPOV), the computer program comprising instructions to:
receive input from a user defining the graphical representation including at least one category;
retrieve unique identifiers for the at least one category from at least one of a knowledge database;
obtain significance and interest relations for the at least one category based on a placement of the at least one category on the graphical representation;
determine connections between the at least one category and data source to identify data sources having similar unique identifiers;
retrieve data sets from the data sources for the at least one category, the data sets being limited by the significance and interest relations;
apply a similarity analysis to the data sets to;
determine confidence levels for the at least one category, wherein the similarity analysis depends on a datatype of the data source and on the interest relations for the at least one category;
apply the significance relations for the at least one category to the confidence levels to obtain relevance scores for items in the data sets;
present, for items having a relevance score above a threshold, the relevance scores, confidence levels and items to the user in the context of the iPOV.

2. The computer program of claim 1, further comprising instructions to manipulate the graphical representation, wherein the instructions to manipulate include instructions to obtain multiple hierarchies having components related to the unique identifiers of iPOV for selection by the user.

3. The computer program of claim 2, wherein instructions to manipulate include instructions to combine the multiple hierarchies.

4. The computer program of claim 2, wherein instructions to manipulate include instructions to link the multiple hierarchies.

5. The computer program of claim 1, wherein the instructions to manipulate include instructions to modify at least one of positioning of elements of the iPOV in the graphical representation and connections between the elements of the iPOV in the graphical representation to affect the placement of the at least one category.

6. The computer program of claim 5, wherein the instructions to present include instructions to:
receive input from the user designating at least one member of the data sets as an interest member;
generate an updated graphical representation of the iPOV for each of the data sets, the updated graphical representation differentiating elements of the iPOV having at least one interest member.

7. The computer program of claim 1, wherein the instructions to apply include instructions to execute logic modules representing a set of category definitions embodied by the structure of the iPOV.

8. The computer program of claim 7, wherein the instructions to present include instructions to generate updated graphical representations of the iPOV based on execution of the logic modules, the confidence levels being associated with elements of the updated graphical representations corresponding to the components iPOV and representing whether each returned item of the data sets qualifies as a member of the at least one category.

9. The computer program of claim 7, wherein the instructions to present include instructions to execute the logic modules to apply set theory to determine set membership for components of the hierarchy, wherein the logic modules include prepositional logic regarding sets of attributes.

10. The computer program of claim 1, wherein the instructions to obtain significance and interest relations include instructions to receive significance and interest values input by the user.

11. The computer program of claim 1, wherein the instructions to obtain significance and interest relations include instructions to:

calculate significance and interest values based on at least one of locations of the at least one category of the iPOV in the graphical representation and positioning of connections between the at least one category of the iPOV in the graphical representation;

set thresholds for the confidence levels for at least one of the iPOV and each at least one category for inclusion of members of the data sets; and set weighting functions for the at least one category based on a distribution pattern of the at least one category.

12. The computer program of claim 11, wherein the instructions to determine connections include instructions to compare components of the hierarchy with a connections database, the connections database including degrees of matching between data elements in the connections database and the data source metadata.

13. The computer program of claim 12, wherein the instructions to manipulate include instructions to modify at least one of positioning of elements of the iPOV in the graphical representation and connections between the elements of the iPOV in the graphical representation to affect the structure of the hierarchy.

14. The computer program of claim 13, wherein:
the instructions to apply include instructions to execute logic modules representing set theory rules embodied by the structure of the hierarchy; and
the instructions to present include instructions to execute the logic modules to unpack data structures in the data sets to generate updated graphical representations of the iPOV, the confidence levels being associated with elements of the updated graphical representations corresponding to the components of the hierarchy related to the data sets.

15. The computer program of claim 11, wherein the instructions to manipulate include instructions to modify at least one of positioning of elements of the iPOV in the graphical representation and connections between the elements of the iPOV in the graphical representation to affect the structure of the hierarchy.

16. The computer program of claim 11, wherein:
the instructions to apply include instructions to execute logic modules representing set theory rules embodied by the structure of the hierarchy; and
the instructions to present include instructions to execute the logic modules to unpack data structures in the data sets to generate updated graphical representations of the iPOV, the confidence levels being associated with elements of the updated graphical representations corresponding to the components of the hierarchy related to the data sets.

17. The computer program of claim 1, wherein the instructions to determine connections include instructions to compare the at least one category with a connections database, the connections database including degrees of matching between data elements in the connections database and the data source metadata.

18. The computer program of claim 1, wherein the instructions to present include instructions to:
receive input from the user designating at least one member of the data sets as an interest member; and
generate an updated graphical representation of the iPOV for each of the data sets related to the components of the hierarchy, the updated graphical representation including differentiated components of the hierarchy based on the differentiated components having at least one interest member.

19. A computer-readable medium containing data structure for defining the set theory used to describe sets of data in the data structure, the data structure comprising:
data elements linked in sets wherein the sets include lists of data elements,
like word arrays of data elements with associated relativity factors,
generative descriptions for executing procedures to determine criteria for inclusion of data elements as set members based on the relativity factors,
assertive attributes for obtaining the generative descriptions, the assertive attributes assigned to the sets of data when the sets of data are defined by a system incorporating the data structure,
proposed attributes for obtaining the generative descriptions, the proposed attributes assigned to the sets of data when the sets of data are defined by a user of the data structure, and
fitness functions for executing procedures using the criteria to determine fitness of a data element for being a member of a set, the data elements within sets being linked by degrees of matching determined by the fitness function,
wherein at least one of the set members and the degrees of matching is presented to the user of the data structure.

20. The computer-readable medium of claim 19, wherein the fitness functions include:
similarity procedures to specify characteristics qualifying a data element for being a member of a set; and
difference procedures to specify characteristics excluding a data element from being a member of a set.

21. A system for enabling multiple hierarchical points of view, comprising:
a host processor;
a user interface controlled by the host processor for inputting points of view to the system;
a connections generator controlled by the host processor and in communication with the user interface to receive the points of view and generate connections between elements in the points of view and metadata of data sources;
a connections database operated on by the connections generator in generating the connection and having a data structure including degrees of matching between data elements in the connections database and the metadata; and
matching applications controlled by the host processor and operating on the data sources to determine sets of data elements in the data sources having at least preselected degrees of matching with the elements in the points of view, the user interface displaying the data elements and degrees of matching for the data elements according to the points of view.

22. The system of claim 21, comprising a communications application controlled by the host processor and in communication with at least one network for connecting a user to the system.

23. The system of claim 21, comprising a significance and interest processor controlled by the host processor and in communication with the user interface to obtain significance and interest relations based on characteristics of the points of view, the degrees of matching between the data elements being associated with the significance and interest relations.

24. The system of claim 21, comprising executable logic modules controlled by the host processor and representing set theory rules embodied by the hierarchy structures, the logic modules unpacking data structures in the sets of data elements to format the results for output.

25. The system of claim 24, wherein the matching applications include:
similarity procedures to specify characteristics determining the sets of data elements having at least the preselected degrees of matching; and
difference procedures to specify characteristics excluding data elements from the sets.

26. A computer program tangibly stored on a computer-readable medium and configured to cause a computer to enable searching of data records, the computer program comprising instructions to:
receive input from a user;
determine at least one hierarchy having components matching the input;
present the at least one hierarchy to the user for manipulation and selection by the user to obtain a selected hierarchy;
obtain significance and interest relations for components of the selected hierarchy based on a structure of the hierarchy;
apply a connections generator to a connections database having a data structure including degrees of matching between data elements in the connections database and metadata of data sources to obtain connectivity data between elements in the selected hierarchy and the metadata of the data sources, the connectivity data identifying connected data sources;
search the connected data sources for data matching the components of the selected hierarchy based on the connectivity data to obtain matching data;
determine confidence levels for the matching data based on the significance and interest relations; and
present the matching data and the confidence levels to the user in the context of the selected hierarchy.

27. The computer program of claim 26, wherein the instructions to apply include instructions to execute logic modules representing set theory rules embodied by the structure of the hierarchy.

28. The computer program of claim 27, wherein the instructions to present comprise instructions to execute the logic modules to unpack data structures in the data sets to generate updated representations of the selected hierarchy.

29. The computer program of claim 17, wherein the instructions to obtain significance and interest relations comprise instructions to calculate significance and interest values based on at least one of locations of elements of the selected hierarchy and positioning of connections between elements of the selected hierarchy.

30. A computer program tangibly stored on a computer-readable medium and configure to cause a computer to enable a user interface for encoding a configuration of a similarity engine, the computer program comprising instructions to:
receive input from a user defining an individual point of view (iPOV) related to categories of data;
obtain, based on the iPOV, significance and interest values and a match threshold to encode an equation;
manipulate the confirmation based on the iPOV to obtain a modified configuration of the similarity engine, the modified configuration limiting matching by the similarity engine to data resources consistent with the significance and interest values and the match threshold;
obtain, using the modified configuration, data sets having varying relationships to the categories and data of the categories, wherein each relationship represents a position along a similarity vector determined by the modified configuration of the similarity engine;
determine confidence levels for membership of data items in the categories along each similarity vector;
combine, utilizing the equation, the confidence levels into a relativity score for the data items, the relativity score providing a measure of a similarity distance of the data item to at least one the categories and the data of the categories; and
present the relativity scores to the user in a context of the iPOV.

31. The computer program of claim 30, wherein the instructions to present comprise instructions to present the relativity scores for each of the categories in a separate graphical representation, wherein the data items are distinguished based on the relativity scores to characterize the data items in accordance with the iPOV.

* * * * *